US008131810B2

(12) United States Patent
Tsutazawa et al.

(10) Patent No.: US 8,131,810 B2
(45) Date of Patent: Mar. 6, 2012

(54) REACHABILITY REALIZATION SERVER, MANAGEMENT SYSTEM, MANAGEMENT METHOD AND REALIZATION PROGRAM

(75) Inventors: Natsuko Tsutazawa, Tokyo (JP); Takeaki Minamizawa, Tokyo (JP)

(73) Assignee: NEC Corporation, Tokyo (JP)

( * ) Notice: Subject to any disclaimer, the term of this patent is extended or adjusted under 35 U.S.C. 154(b) by 148 days.

(21) Appl. No.: 12/530,350

(22) PCT Filed: Mar. 7, 2008

(86) PCT No.: PCT/JP2008/054208
§ 371 (c)(1),
(2), (4) Date: Sep. 8, 2009

(87) PCT Pub. No.: WO2008/108474
PCT Pub. Date: Sep. 12, 2008

(65) Prior Publication Data
US 2010/0106773 A1    Apr. 29, 2010

(30) Foreign Application Priority Data

Mar. 7, 2007  (JP) ................................ 2007-057597
Sep. 14, 2007 (JP) ................................ 2007-239321

(51) Int. Cl.
*G06F 15/16* (2006.01)
(52) U.S. Cl. .................... 709/206; 709/203; 370/328
(58) Field of Classification Search .............. 709/203, 709/206; 370/328
See application file for complete search history.

(56) References Cited

U.S. PATENT DOCUMENTS 6,954,442 B2 * 10/2005 Tsirtsis et al. ............... 370/328
2010/0071053 A1 *  3/2010 Ansari et al. ................. 726/12

FOREIGN PATENT DOCUMENTS

| JP | 2000-305875 | 11/2000 |
| JP | 2002-135334 | 5/2002 |
| JP | 2002-279027 | 9/2002 |
| JP | 2003-109160 | 4/2003 |
| JP | 2004-318284 | 11/2004 |
| JP | 2006-277715 | 10/2006 |

OTHER PUBLICATIONS

"My Boomerang", Boomerang it Japan, (searched on Feb. 22, 2007), URL:http://www.bij.jp/.

* cited by examiner

*Primary Examiner* — Adnan Mirza
(74) *Attorney, Agent, or Firm* — Scully, Scott, Murphy & Presser, P.C.

(57) ABSTRACT

A server realizes reachability from a first user to a second user. The server (100, 200) includes a real-address-information receiving section (110) that receives real-address information, which is capable of contacting therethrough to the second user, from a second terminal (10) used by the second user; and a post-conversion-address-information generation section that generates post-conversion-address information, which the first user cannot specify, based on the real-address information received by the real-address-information receiving section.

34 Claims, 26 Drawing Sheets

| REAL ID | REACHABILITY ID | TERM OF VALIDITY |
|---|---|---|
| 312345678 | 3e977b1c3611a85fece041c55ac01ae3 | 2010/1/1 18:30 |
| 422345278 | 4d40a4adb5ada496d96610b0dd9f8042 | 2008/12/4 4:12 |

| REAL ID | REACHABILITY ID | SERVICE ID |
|---|---|---|
| 0312345678 | 3e977b1c3611a85fece041c55ac01ae3 | rescue 123456 |
| 0422345278 | 4d40a4adb5ada496d96610b0dd9f8042 | advertise 123456 |

FIG. 8
| REAL ID | REACHABILITY ID | SERVICE ID |
|---|---|---|
| 312345678 | 3e977b1c3611a85fece041c55ac01ae3 | rescue 123456 |
| 312345678 | 3e977b1c3611a85fece041c55ac01ae4 | rescue 123456 |
| 312345678 | 3e977b1c3611a85fece041c55ac01ae5 | rescue 123456 |
| 312345678 | 3e977b1c3611a85fece041c55ac01ae6 | rescue 123456 |
| 312345678 | 3e977b1c3611a85fece041c55ac01ae7 | rescue 123456 |
FIG. 9
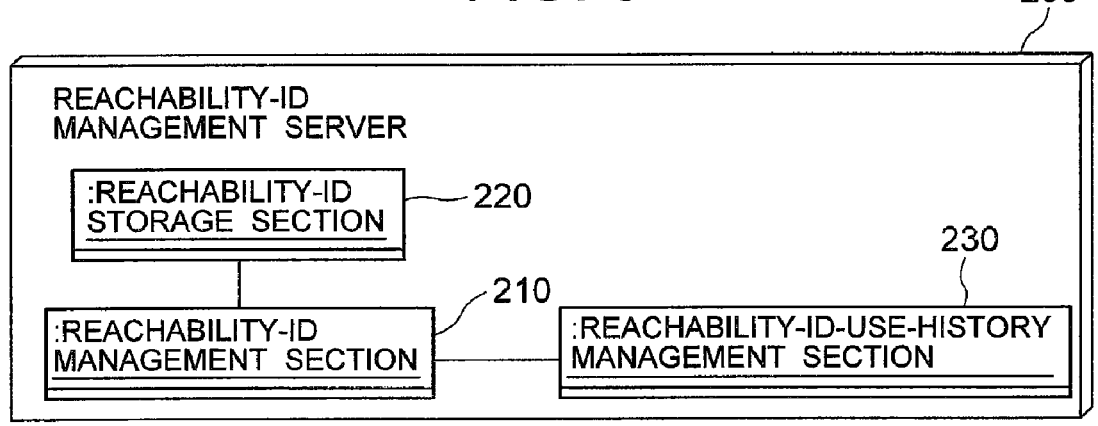
FIG. 10
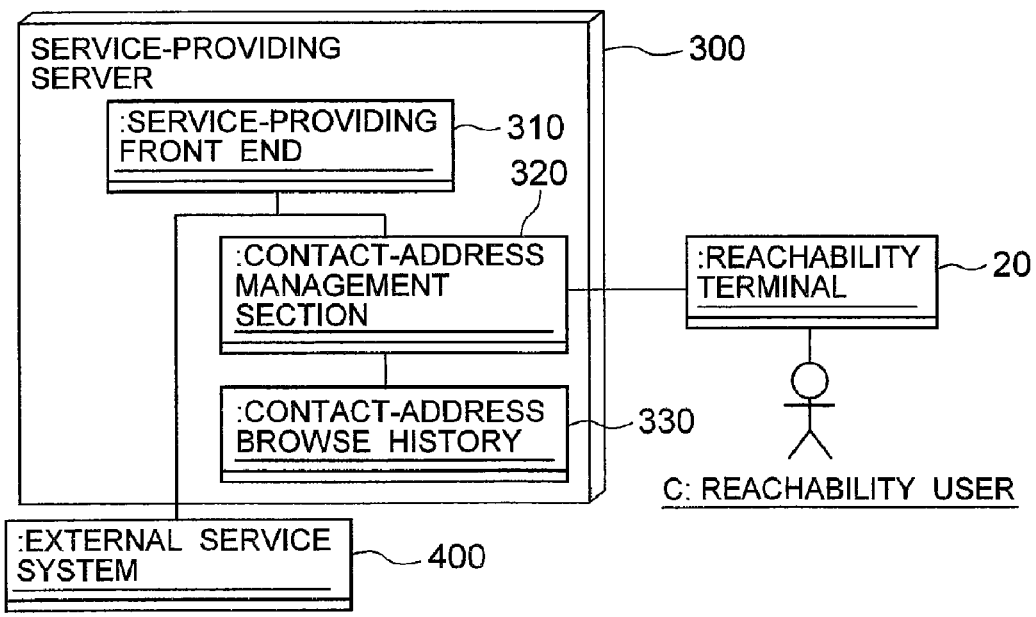

FIG.14

| REACHABILITY ID | TIME INSTANT OF REAL-ID ACQUISITION |
|---|---|
| 3e977b1c3611a85fece041c55ac01ae3 | 2006/12/26 9:12 |
| 3e977b1c3611a85fece041c55ac01ae3 | 2006/12/28 12:40 |
| 3e977b1c3611a85fece041c55ac01ae3 | 2006/12/29 12:30 |
| 3e977b1c3611a85fece041c55ac01ae3 | 2006/12/30 15:45 |

| REACHABILITY-ID | PRESENT STATE |
|---|---|
| 4d40a4adb5ada496d96610b0dd9f8042 | DURING RECEIVING RESERVATION |

(b)

| REACHABILITY-ID | PRESENT STATE |
|---|---|
| 4d40a4adb5ada496d96610b0dd9f8042 | COMPLETION OF RESERVATION |

(c)

| REACHABILITY-ID | PRESENT STATE |
|---|---|
| 4d40a4adb5ada496d96610b0dd9f8042 | COMPLETION OF APPERANCE |

(d)

| REACHABILITY-ID | PRESENT STATE |
|---|---|
| 4d40a4adb5ada496d96610b0dd9f8042 | END |

FIG.17

| PRESENT STATE | CONDITION | ACTION | TRANSITION DESTINATION |
|---|---|---|---|
| DEFAULT | NO | NO | DURING RECEIVING RESERVATION |
| DURING RECEIVING RESERVATION | SERVICE-USE REQUEST FROM reachabilityId | RESERVATION IS RECEIVED FROM doReachability (reachabilityId, A); notify ("reachabilityId, to, reachabilityId+"); | COMPLETION OF RESERVATION |
| COMPLETION OF RESERVATION | APPEARANCE OF reachabilityId | doReachability(reachabilityId, B); | COMPLETION OF APPERANCE |
| COMPLETION OF APPERANCE | reachabilityId LEFT ARTICLE BEHIND | doReachability(reachabilityId, A); | END |

FIG.18

| VARIABLE | ACTION |
|---|---|
| A | VALID |
| B | INVALID |

| REAL ID | REACHABILITY-ID | VALIDITY FLAG |
|---|---|---|
| tsuta@tsuta.com | 4d40a4adb5ada496d96610b0dd9f8042 | VALID |

(b)

| REAL ID | REACHABILITY-ID | VALIDITY FLAG |
|---|---|---|
| tsuta@tsuta.com | 4d40a4adb5ada496d96610b0dd9f8042 | INVALID |

FIG.20

| SERVICE ID | CONTACT ADDRESS |
|---|---|
| restaurant1234 | restaurant1234@example.com |
| loan1234 | sip:loan1234@aaa.com |
| audit1234 | audit1234@bbbb.com |

| REACHABILITY-ID | PRESENT STATE |
|---|---|
| 4d40a4adb5ada496d96610b0dd9f8042 | DURING RECEIVING LOAN REQUEST |

(b)

| REACHABILITY-ID | PRESENT STATE |
|---|---|
| 4d40a4adb5ada496d96610b0dd9f8042 | DURING PREPARING LOAN |

(c)

| REACHABILITY-ID | PRESENT STATE |
|---|---|
| 4d40a4adb5ada496d96610b0dd9f8042 | DURING AUDIT |

(d)

| REACHABILITY-ID | PRESENT STATE |
|---|---|
| 4d40a4adb5ada496d96610b0dd9f8042 | END |

FIG.26

| PRESENT STATE | CONDITION | ACTION | TRANSITION DESTINATION |
|---|---|---|---|
| DEFAULT | NO | NO | DURING RECEIVING RESERVATION |
| DURING RECEIVING RESERVATION | DURING RECEIVING LOAN REQUEST | LOAN REQUEST IS RECEIVED FROM doReachability (reachabilityId1, A); notify ("reachabilityId1, to1, reachabilityId1+");" | DURING PREPARING LOAN |
| DURING REPARING LOAN | AUDIT REQUEST | LOAN TO doReachability (reachabilityId2, C); notify "(reachabilityId2, to2, reachabilityId2 +");" IS UNDER AUDIT | DURING AUDIT |
| DURING AUDIT | REPORT OF AUDIT RESULT; FAILUER IN AUDIT | AUDIT OF doReachability (reachabilityId2, D); notify "(reachabilityId1, to1, reachabilityId1 +");" IS FAILED | END |

FIG.27

| VARIABLE | ACTION |
|---|---|
| A | VALID |
| B | INVALID |
| C | GENERATION |
| D | DELETION |

| REAL ID | REACHABILITY-ID | VALIDITY FLAG | REACHABILITY ID2 |
|---|---|---|---|
| tsuta@tsuta.com | 4d40a4adb5ada496d96610b0dd9f8042 | VALID | |

(b)

| REAL ID | REACHABILITY-ID | VALIDITY FLAG | REACHABILITY ID2 |
|---|---|---|---|
| tsuta@tsuta.com | 4d40a4adb5ada496d96610b0dd9f8042 | VALID | 5d40a6adb6ada596d96610b1de9f9053 |

FIG.29

| VARIABLE | ACTION | NUMBER OF TIMES |
|---|---|---|
| A | VALID | 3 |

FIG.30

| VARIABLE | ACTION | PERIOD |
|---|---|---|
| A | VALID | 60 |

FIG.31

| VARIABLE | ACTION | TIME INSTANT |
|---|---|---|
| A | VALID | 2010/1/1 |

FIG.32

| VARIABLE | ACTION | NUMBER OF TIMES | PERIOD | TIME INSTANT |
|---|---|---|---|---|
| A | VALID | 3 | 60 | 2010/1/1 23:59 |

FIG.34

| PRESENT STATE | CONDITION | ACTION | TRANSITION DESTINATION |
|---|---|---|---|
| DEFAULT | NO | NO | DURING RECEIVING RESERVATION |
| DURING RECEIVING RESERVATION | SERVICE-USE REQUEST FROM reachabilityId | RESERVATION IS RECEIVED FROM doReachability (reachabilityId, VALID, 1000 TIMES, 10000 SECONDS, 3000/1/1/00:00); notify ("reachabilityId+"); | COMPLETION OF RESERVATION |
| COMPLETION OF RESERVATION | ReachabilityId APPEARS | doReachability(reachabilityId, INVALID); | COMPLETION OF APPERANCE |
| COMPLETION OF APPERANCE | reachabilityId LEAVES ARTICLE BEHIND | doReachability(reachabilityId, VALID, "≦1"); | END |

| REQUEST ID | PRESENT STATE |
|---|---|
| 1 | END |
| 2 | DURING RECEIVING RESERVATION |

(b)

| REQUEST ID | PRESENT STATE |
|---|---|
| 1 | END |
| 2 | COMPLETION OF RESERVATION |

(c)

| REQUEST ID | PRESENT STATE |
|---|---|
| 1 | END |
| 2 | COMPLETION OF APPERANCE |

(d)

| REQUEST ID | PRESENT STATE |
|---|---|
| 1 | END |
| 2 | END |

FIG.36

| PRESENT STATE | CONDITION | ACTION | TRANSITION DESTINATION |
|---|---|---|---|
| DEFAULT | NO | NO | DURING RECEIVING RESERVATION |
| DURING RECEIVING RESERVATION | SERVICE-USE REQUEST FROM reachabilityId | RESERVATION IS RECEIVED FROM doReachability (requestId, A); notify ("reachabilityId, requestId, to, reachabilityId+"); | COMPLETION OF RESERVATION |
| COMPLETION OF RESERVATION | reachabilityId APPEARS | doReachability(requestId, B); | COMPLETION OF APPERANCE |
| COMPLETION OF APPERANCE | reachabilityId LEAVES ARTICLE BEHIND | doReachability(requestId, A); | END |

| REAL ID | SERVICE ID | REACHABILITY ID | REQUEST ID | VALIDITY FLAG |
|---|---|---|---|---|
| tsuta@tsuta.com | restaurant1234 | 4d40a4adb5ada496d96610b0dd9f8042 | 1 | VALID |

(b)

| REAL ID | SERVICE ID | REACHABILITY ID | REQUEST ID | VALIDITY FLAG |
|---|---|---|---|---|
| tsuta@tsuta.com | restaurant1234 | 4d40a4adb5ada496d96610b0dd9f8042 | 1 | VALID |
| tsuta@tsuta.com | restaurant1234 | 4d40a4adb5ada496d96610b0dd9f8042 | 2 | |

(c)

| REAL ID | SERVICE ID | REACHABILITY ID | REQUEST ID | VALIDITY FLAG |
|---|---|---|---|---|
| tsuta@tsuta.com | restaurant1234 | 4d40a4adb5ada496d96610b0dd9f8042 | 1 | VALID |
| tsuta@tsuta.com | restaurant1234 | 4d40a4adb5ada496d96610b0dd9f8042 | 2 | VALID |

(d)

| REAL ID | SERVICE ID | REACHABILITY ID | REQUEST ID | VALIDITY FLAG |
|---|---|---|---|---|
| tsuta@tsuta.com | restaurant1234 | 4d40a4adb5ada496d96610b0dd9f8042 | 1 | VALID |
| tsuta@tsuta.com | restaurant1234 | 4d40a4adb5ada496d96610b0dd9f8042 | 2 | INVALID |

REACHABILITY REALIZATION SERVER, MANAGEMENT SYSTEM, MANAGEMENT METHOD AND REALIZATION PROGRAM

TECHNICAL FIELD

The present invention relates to a reachability realization server, a reachability management system, a reachability management method and a reachability realization program that manage reachability.

BACKGROUND ART

Reachability means a capability of reaching to a specific person or object. Hereinafter, a system is considered that handles a reachability (capability of reaching of information etc.) from a reachability user to a specific service client. JP-2003-109160A (Patent Publication-1) and "My Boomerang", [online], Boomerang it Japan, [searched on Feb. 22, 2007], on the Internet <URL:http://www.bij.jp/> (Non-Patent Literature-1) describe a system that handles the reachability. In Patent Publication-1, an emergency-rescue supporting system that performs emergency communication to a rescue expert, i.e., service client that has concluded a contract upon detecting a fact that an abnormal physical state occurs in a user, i.e., the reachability user. In Patent Publication-1, it is described that the user and the rescue expert directly conclude a contract therebetween by radio, and the user registers in advance the profile (reachability) of the rescue expert. Note that the service client is one that presents a reachability, i.e, that discloses the address or telephone number thereof, for example.

Non-Patent Literature-1 describes that a label on which the contact address and identity of a lost-article recovery-service agent company are described beforehand is bonded onto precious good. If the precious good is lost and a finder thereof communicates to the contact address described on the label, the lost-article recovery-service agent company collects the precious good from the finder, retrieves the owner based on the identity of the precious good, and delivers the precious good to the owner. Non-Patent Literature-1 also describes that by allowing the finder to notify the own contact address to the lost-article recovery-service agent company, the lost-article recovery-service agent company recompenses the finder on behalf of the owner of the precious good.

However, the system described in Patent Publication-1 or Non-Patent Literature-1 has the problem that it is possible for the user of the emergency-rescue supporting system, reachability user such as the owner of the precious good, or service provider of the emergency-rescue supporting system, lost-article recovery-service agent company to unjustly use the reachability to the service client, such as the rescue expert and finder of the precious good.

For example, in the technique described in Patent Publication-1, the user can acquire the profile of the rescue expert by concluding a contract therewith. Therefore, unless the rescue expert changes the profile, the profile of the rescue expert may be unjustly used by the user, or the rescue expert may be hung around.

In the technique described in Non-Patent Literature-1, since the lost-article recovery-service agent company obtains the contact address of the finder, there is a possibility that the contact address may be used for a use other than the remuneration, or unnecessary communication may be received from the lost-article recovery-service agent company, unless the finder changes the contact address. In the technique described in Non-Patent Literature-1, a third party (owner of the precious good) other than the finder and lost-article recovery-service agent company cannot use the reachability. For example, the reachability user cannot contact the service client.

SUMMARY OF THE INVENTION

Thus, it is an object of the present invention to provide a reachability realization server, a reachability management system, a reachability management method, and a reachability realization program that are capable of allowing a reachability user to contact to a service client, without causing a unjustified use of the reachability to the service client.

The present invention provides, in a first aspect thereof, a reachability realization server that realizes reachability from a first user to a second user that have therebetween no acquaintance, including: a real-address-information receiving section that receives real-address information, which is capable of contacting therethrough to the second user, from a second terminal used by the second user; and a post-conversion-address-information generation section that generates post-conversion-address information, which the first user cannot specify, based on the real-address information received by the real-address-information receiving section.

The present invention provides, in a second aspect thereof, a reachability management system that manages reachability from a first user to a second user that have therebetween no acquaintance, including: a first user terminal used by the first user; a second user terminal used by the second user; and a reachability realization server that realizes reachability from the first user to the second user, the reachability realization server including: a real-address-information receiving section that receives from the second user terminal real-address information that is capable of contacting therethrough to the second user; and a post-conversion-address-information generation section that generates, based on the real-address information received by the real-address-information receiving section, post-conversion-address information through which the first user cannot specify the real-address information, wherein the first user terminal accesses the second user terminal based on the post-conversion-address information generated by the post-conversion-address-information generation section.

The present invention provides, in a third aspect thereof, a reachability management method by which a reachability realization server manages reachability from a first user to a second user that have therebetween no acquaintance, wherein: the reachability realization server receives, from a second user terminal used by the second user, real-address information that is capable of contacting therethrough to the second user; the reachability realization server generates, based on the received real-address information, post-conversion-address information through which the first user cannot specify the real-address information; and a first user terminal used by the first user accesses the second user terminal based on the post-conversion-address information generated by the reachability realization server.

The present invention provides, in a fourth aspect thereof, a reachability realization program that realizes reachability from a first user to a second user that have therebetween no acquaintance, the program causing a computer to execute: real-address-information receiving processing that receives, from a second user terminal used by the second user, real-address information that is capable of contacting therethrough to the second user; post-conversion-address-information generation processing that generates, based on the real-address information received in the real-address-information receiving processing, post-conversion-address information through which the first user cannot specify the real-address information.

The above and other objects, features and advantages of the present invention will be more apparent from the following description, referring to the drawings.

BRIEF DESCRIPTION OF THE DRAWINGS

FIG. 8 is an explanatory chart exemplifying a case where the reachability-ID storage section stores reachability IDs with respect to a single ID and a single service ID.

FIG. 9 is a block diagram exemplifying the reachability-ID management server in a third embodiment.

FIG. 10 is a block diagram exemplifying a reachability management system according to a fourth embodiment.

FIG. 14 is an explanatory chart exemplifying history data.

FIG. 16 is an explanatory chart showing an example of registration of the present-state management table in the sixth embodiment.

FIG. 17 is an explanatory chart showing an example of registration of the flow template table in the sixth embodiment.

FIG. 18 is an explanatory chart showing an example of registration of the reachability-ID action table in the sixth embodiment.

FIG. 19 is an explanatory chart showing an example of registration of the reachability-ID-validity management table in the sixth embodiment.

FIG. 20 is an explanatory chart showing an example of registration of the service management table.

FIG. 25 is an explanatory chart showing an example of registration of the present-state management table in the seventh embodiment.

FIG. 26 is an explanatory chart showing an example of registration of the flow template table in the seventh embodiment.

FIG. 27 is an explanatory chart showing an example of registration of the reachability-ID action table in the seventh embodiment.

FIG. 28 is an explanatory chart showing an example of registration of the reachability-ID-validity management table in the seventh embodiment.

FIG. 29 is an explanatory chart showing an example of registration of the reachability-ID action table in an eighth embodiment.

FIG. 30 is an explanatory chart showing an example of registration of the reachability-ID action table in an ninth embodiment.

FIG. 31 is an explanatory chart showing an example of registration of the reachability-ID action table in a tenth embodiment.

FIG. 32 is an explanatory chart showing an example of registration of the reachability-ID action table in an eleventh embodiment.

FIG. 34 is an explanatory chart showing an example of registration of the flow template table in the twelfth embodiment.

FIG. 35 is an explanatory chart showing an example of registration of the present-state management table in a fourteenth embodiment.

FIG. 36 is an explanatory chart showing an example of registration of the flow template table in the fourteenth embodiment.

FIG. 37 is an explanatory chart showing an example of registration of the reachability-ID-validity management table in the fourteenth embodiment.

DETAILED DESCRIPTION OF THE INVENTION

Figure 1:
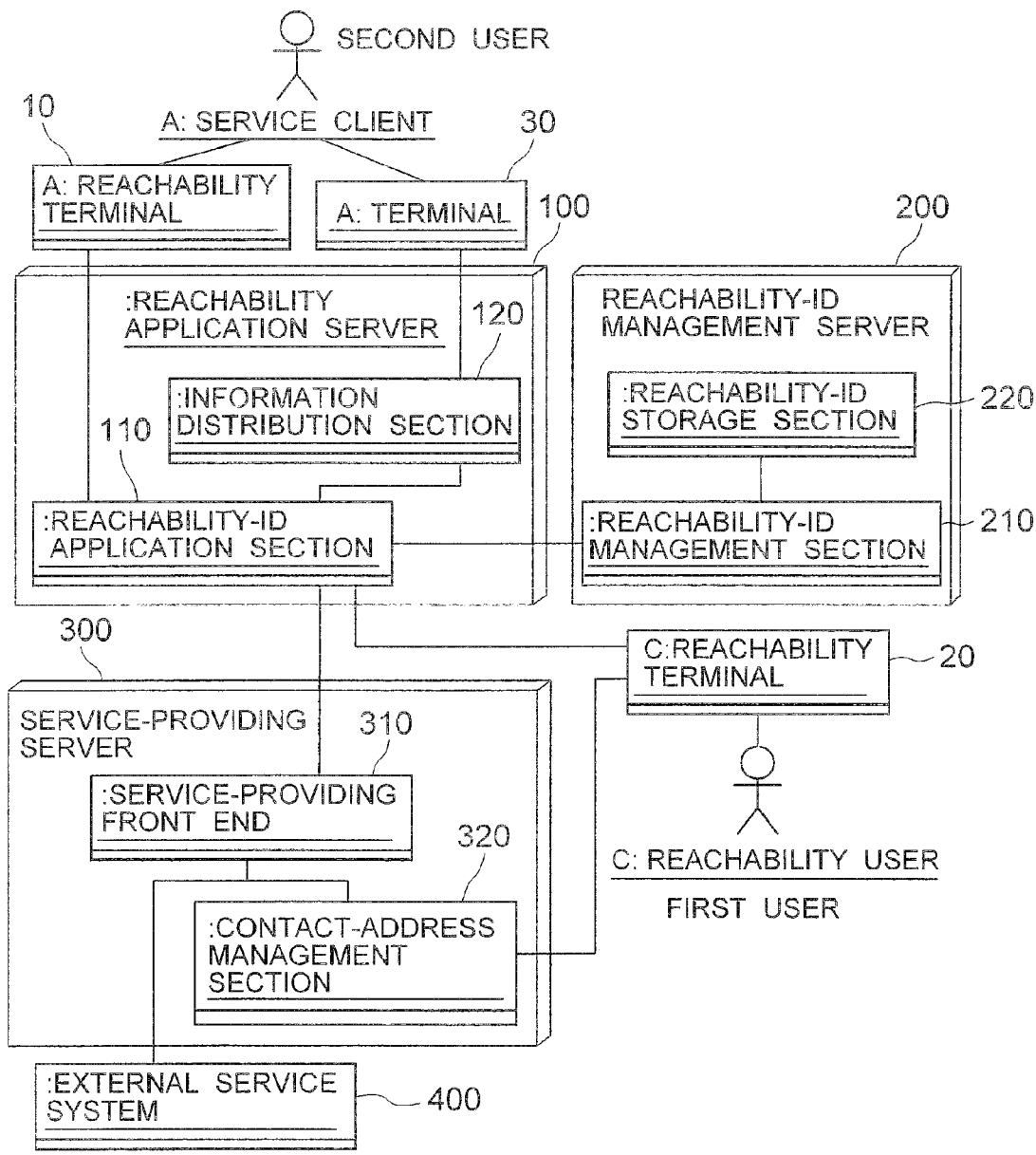
FIG. 1 is a block diagram exemplifying a reachability management system according to a first embodiment.

Hereinafter, exemplary embodiments of the present invention will be described in detail with reference to the drawings. In all the drawings, similar reference numerals denote similar elements.

Embodiment 1

FIG. 1 is a block diagram of a reachability management system of a first embodiment of the present invention. The reachability management system includes reachability terminals 10 and 20, a terminal 30, a reachability application server 100, a reachability-ID management server 200, a service-providing server 300, and an external service system 400.

The reachability terminals 10 and 20 are capable of communicating, for example, with the reachability application server 100 and service-providing server 300 via a communication network, such as the Internet. The reachability terminals 10 and 20 are realized by a personal computer, a PDA, a mobile terminal etc., for example. The reachability terminal 10 is used by a service client. The reachability terminal 20 is used by a reachability user.

The reachability terminal 10 transmits a service-use request including a real ID of the service client, and an identity of the reachability user to the reachability application server 100. The reachability terminal 20 transmits a contact request including the reachability ID of service client to the reachability application server 100. If the reachability terminals 10 and 20 are realized by a personal computer, the above function is realized when a CPU mounted on the personal computer executes a program that realizes those functions.

The terminal 30 receives a contact from the reachability application server 100 via, for example, a communication network, such as the Internet. The terminal 30 is realized by a personal computer, PDA, mobile terminal etc., for example. The terminal 30 is used by the service client. Although the reachability terminal 10 and terminal 30 are different terminals in the example of FIG. 1, both the terminals may be the same device.

The reachability application server 100 includes a reachability-ID application section 110 and an information distribution section 120. The reachability-ID application section 110 is connected to the reachability-ID management server 200 and service-providing server 300 for access thereto, for example, the communication network.

The reachability-ID application section 110 transmits a reachability-ID acquisition request including the real ID of the service client and identity of the reachability user to the reachability-ID management server 200 based on the service-use request transmitted from the reachability terminal 10, and receives the reachability ID. The reachability-ID application section 110 transmits the service-providing request including the reachability ID and identity of the reachability user to the service-providing server 300.

The real ID is address information for contacting to the service client, such as the telephone number, e-mail address, and address of the service client, for which a change is difficult for the service client. The reachability ID is an identity delivered to a specific person or object in order to guarantee the safety of reachability thereto. The reachability ID is issued corresponding to the real ID, such as the telephone, e-mail address, and address. A plurality of reachability ID may be issued, or the reachability ID may be temporarily issued for a single real ID.

In the present embodiment, it is possible to generate the reachability ID based on the real ID. Although a variety of calculations are known for calculation of generating the reachability ID, the calculation may use a hash value, for example. In the calculation using the hash value, a reachability ID "3e977b1c3611a85fece041c55ac01ae3", for example, is generated based on a real ID "0312345678".

The reachability-ID application section 110 receives a request of contact to the service client including the reachability ID from the reachability terminal 20. The reachability-ID application section 110 transmits a real-ID acquisition request including the reachability ID to the reachability-ID management server 200 based on the contact request from the reachability terminal 20, and receives the real ID. The information distribution section 120 communicates to the terminal 30 used by the service client based on the real ID received by the reachability-ID application section 110.

The reachability-ID management server 200 includes a reachability-ID management section 210 and a reachability-ID storage section 220. The reachability-ID management server 200 is connected to the reachability application server 100 for access thereto via the communication network, for example.

The reachability-ID management section 210 generates the reachability ID based on the reachability-ID acquisition request from the reachability-ID application section 110. The reachability-ID management section 210 stores the real ID of the service client and the thus generated reachability ID in association in the reachability-ID storage section 220, and transmits the same to the reachability-ID application section 110. The reachability-ID management section 210 transmits the real ID to the reachability-ID application section 110 based on the real-ID acquisition request from the reachability-ID application section 110. The reachability-ID storage section 220 is a memory device that stores therein the real ID of the service client and reachability ID in association.

The service-providing server 300 includes a service-providing front end 310 and contact-address management section 320. The service-providing server 300 is connected to the reachability application server 100 and external service system 400 for access thereto via the communication network, for example. Note that the service-providing server 300 may be operated by a service provider, for example, such as telecommunication company, local government, and care company.

The service-providing front end 310 stores in the contact-address management section 320 the reachability ID and identity of the reachability user based on the service-providing request transmitted from the reachability-ID application section 110. The service-providing front end 310 transmits a service execution request including the identity of reachability user to the external service system 400. The contact-address management section 320 is a memory device that stores therein the reachability ID and the identity of reachability user.

The external service system 400 is a server managed by, for example the service provider that provides a variety of external services. The external service system 400 receives the service execution request transmitted from, for example, the service-providing server 300, and provides an actual service based on the identity of the reachability user received, or performs reception for providing the service.

Next, operation of the first embodiment will be described. The service client uses the service, provided by the external service system 400, via the reachability application server 100 by using the reachability terminal 10. The reachability user can contact to the service client via the reachability application server 100.

In a concrete example, if an informer (service client) notifies to a rescue service that there is a patient who needs an emergency rescue via the reachability application server 100, the rescue service will be performed to rescue the patient. The patient (reachability user) issues to the reachability application server 100 a request of contact to the informer, in order to offer a reward of the rescue information. The reachability application server 100 communicates a recompense contact to the informer.

Here, it is assumed that the service client can know the identity of patient. For example, if the identity is described on a name tag that the patient caries at any time or if the patient has an electronic tag that records data of the own identity, the service client can know the identity of patient. Hereinafter, an example will be described for a case where the service provided by the external service system 400 is the rescue service.

Figure 2:
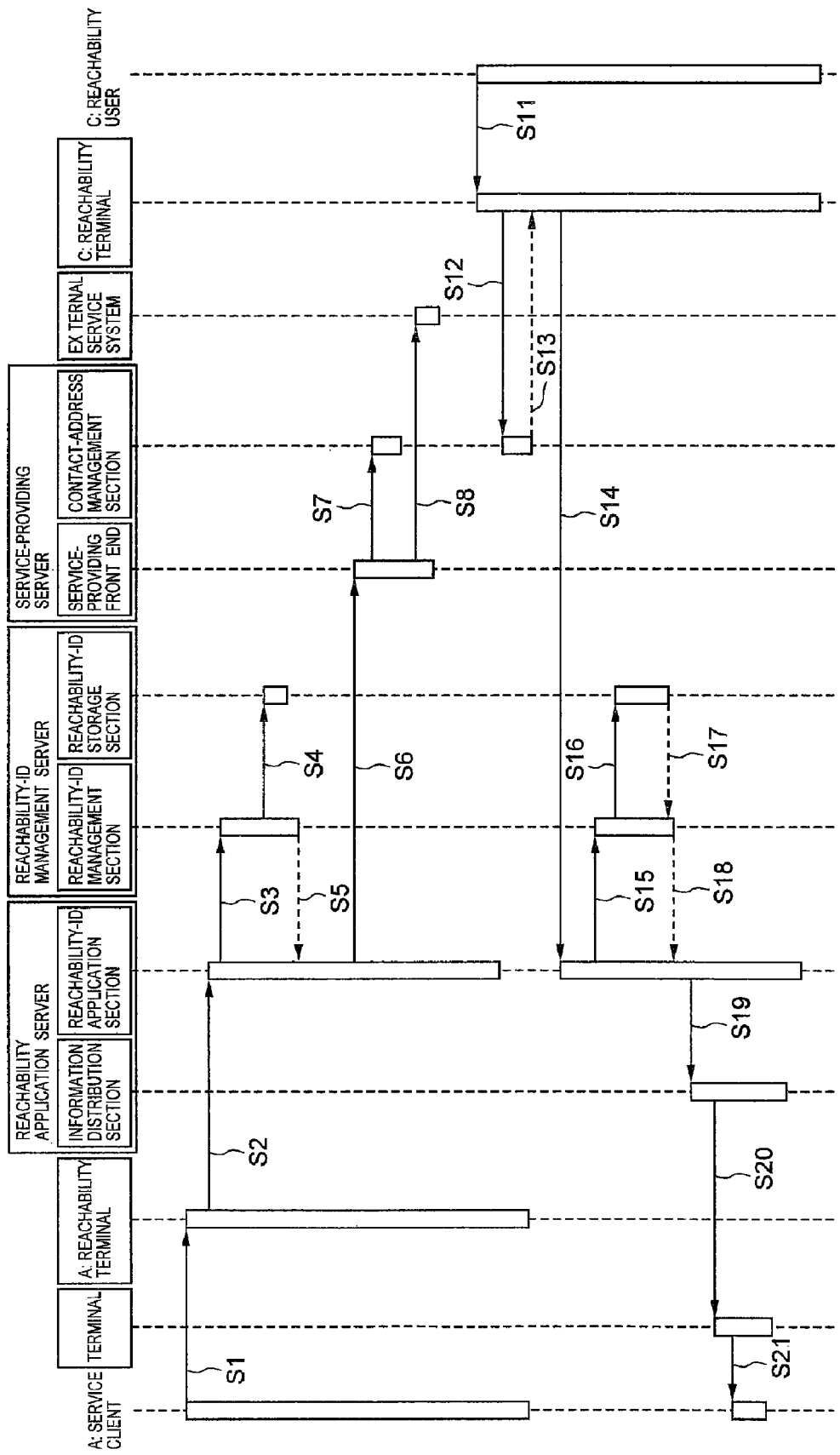
FIG. 2 is a sequence diagram exemplifying operation of the reachability management system of the first embodiment.

FIG. 2 is a sequence diagram exemplifying operation of the reachability management system in the first embodiment. The service client (informer) operates the own reachability terminal 10 (step S1), whereby the reachability terminal 10 transmits a service-use request including the real ID (for example, telephone number) of the service client and identity of the reachability user (patient) to the reachability application server 100 (step S2). Note that the processing of steps S1 and S2 corresponds to communication to the rescue service.

The reachability-ID application section 110 transmits the reachability-ID acquisition request including the real ID of service client to the reachability-ID management server 200 based on the service-use request received (step S3). The reachability-ID management section 210 generates the reachability ID corresponding to the real ID of service client received. The reachability-ID management section 210 allow the reachability-ID storage section 220 to store therein the real ID of service client and the generated reachability ID in pair (step S4). The reachability-ID management section 210 transmits the generated reachability ID to the reachability-ID application section 110 (step S5).

The reachability-ID application section 110 transmits the service-providing request including the reachability ID of service client and the identity of reachability user to the service-providing server 300 (step S6). The service-providing front end 310 allows the contact-address management section 320 to store therein the reachability ID of service client and the identity of patient based on the service-providing request received (step S7). The service-providing front end 310 transmits the service execution request to the external service system 400 (step S8). A rescue of the patient is performed in the present embodiment.

The reachability user operates the own reachability terminal 20 (step S11), whereby the reachability terminal 20 transmits a contact-address acquisition request including the identity of patient to the contact-address management section 320 (step S12), and receives the reachability ID of informer stored in the contact-address management section 320 (step S13). The reachability terminal 20 transmits to the reachability-ID application section 110 a request of contact to the service client (step S14). The contact request is information including the reachability ID of service client.

The reachability-ID application section 110 transmits the real-ID acquisition request including the reachability ID to the reachability-ID management section 210 (step S15). The reachability-ID management section 210 outputs the real-ID acquisition request including the reachability ID of service client to the reachability-ID storage section 220 (step S16). The reachability-ID storage section 220 extracts the real ID of the corresponding service client from the stored pair including the real ID and reachability ID based on the reachability ID, to output the same to the reachability-ID management section 210 (step S17). The reachability-ID management section 210 receives the real ID of service client, and transmits the same to the reachability-ID application section 110 (step S18).

The reachability-ID application section 110 outputs the contact request including the real ID of service client to the information distribution section 120 (step S19). The information distribution section 120 communicates to the terminal 30 based on the real ID of service client (step S20), and the service client receives the contact by using the terminal 30 (step S21). In present embodiment, if the real ID is a telephone number, the information distribution section 120 may telephone the service client. In this case, the terminals 30 may be a fixed-line telephone, a portable telephone or so.

As described heretofore, according to the present embodiment, neither the service provider (external service system 400) nor the reachability user (patient) can know the real ID, whereby the advantage is achieved that unjustified use of the real ID can be prevented with respect to the service client after using the service.

Since the service can be used without being exposed to the threat that the real ID of service client is traced, a communication can be performed without a concern. The patient can offer the reward for rescue to the informer.

In addition, the generation of reachability ID of the service client for each service use can prevent tracing of the reachability ID in the single service.

Figure 3:
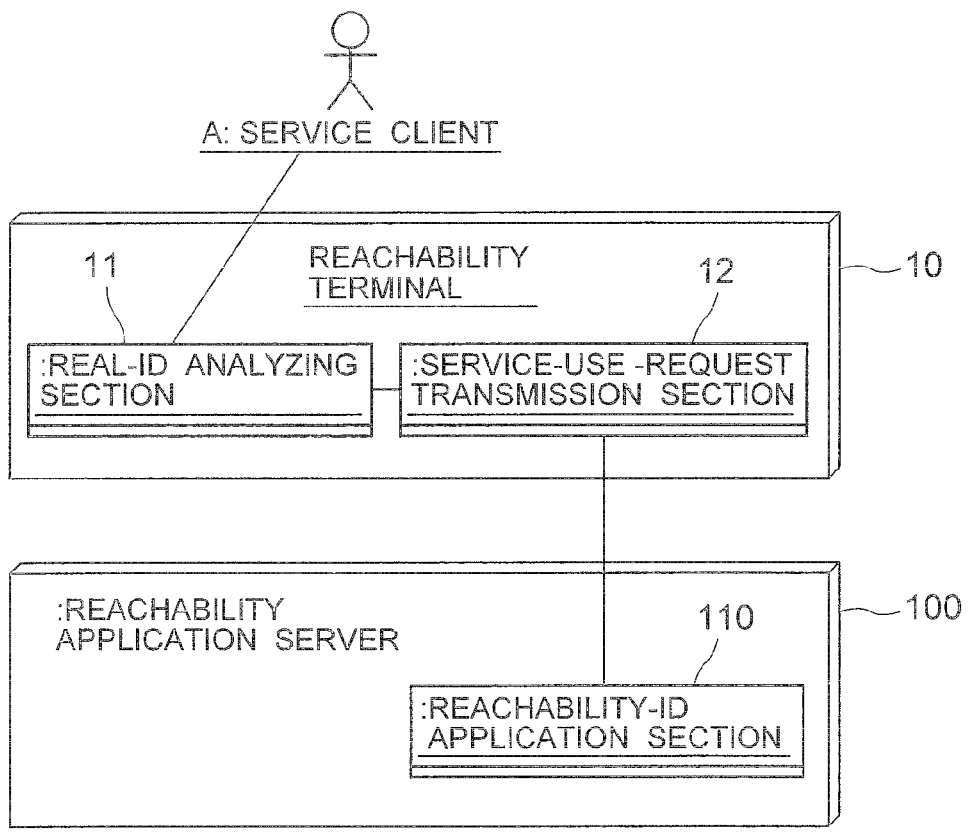
FIG. 3 is a block diagram exemplifying the reachability terminal

The reachability terminal 10 may include a real-ID analyzing section 11 and a service-use-request transmission section 12. FIG. 3 is a block diagram exemplifying the reachability terminal. The real-ID analyzing section 11 analyzes the real ID of service client. The real-ID analyzing section 11 may display a screen image in an interactive form, to urge the service client to input the real ID. The real-ID analyzing section 11 retrieves the real ID while performing, for example, fingerprint authentication.

The service-use-request transmission section 12 transmits the service-use request including the real ID of service client to the reachability-ID application section 110 in the reachability application server 100. Note that FIG. 3 illustrates only the reachability terminal 10 and the reachability-ID application section 110 of the reachability application server 100 in the reachability management system.

The reachability-ID may be reused. The reachability-ID management section 210 inquires the reachability-ID storage section 220 as to whether or not it stores therein the reachability ID corresponding to the real ID, before generating the reachability ID in step S4. If the reachability ID is already generated and the reachability-ID storage section 220 stores therein the same, the reachability-ID management section 210 transmits the generated reachability ID to the reachability-ID application section. Generation of the reachability ID for each service can prevent tracing of the reachability ID among a plurality of services.

Figure 4:
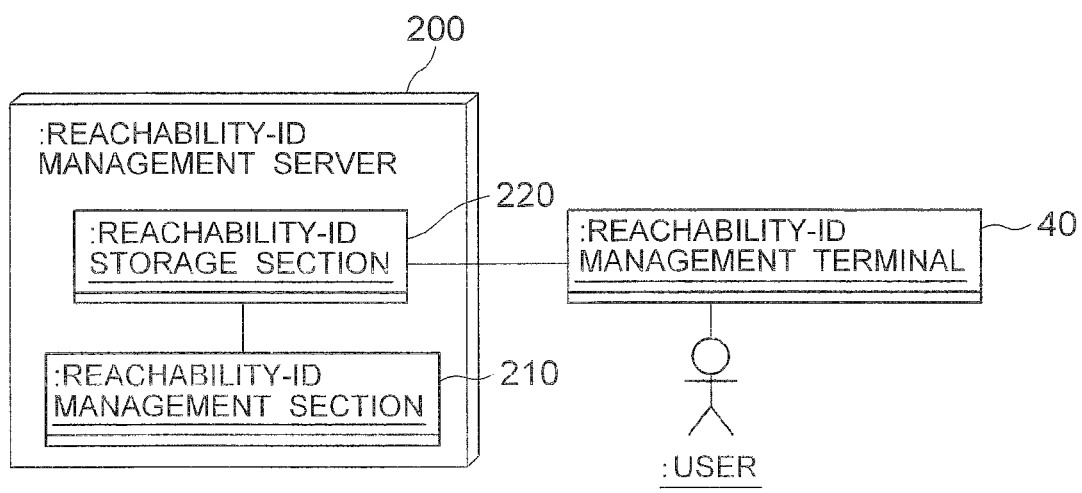
FIG. 4 is a block diagram exemplifying the reachability management system.

The reachability management system may include a reachability-ID management terminal 40. FIG. 4 is a block diagram exemplifying the reachability management system. Note that FIG. 4 shows only the reachability-ID management terminal 40 and reachability-ID management server 200 in the reachability management system.

The reachability-ID management terminal 40 is connected via, for example, the communication network to the reachability-ID management server 200 for access thereto. An arbitrary user may update the reachability ID by using the reachability-ID management terminal 40.

The reachability-ID management section 210 may update the reachability ID in the reachability-ID storage section 220 after the processing of step S18.

Figures 5, 6, 7:
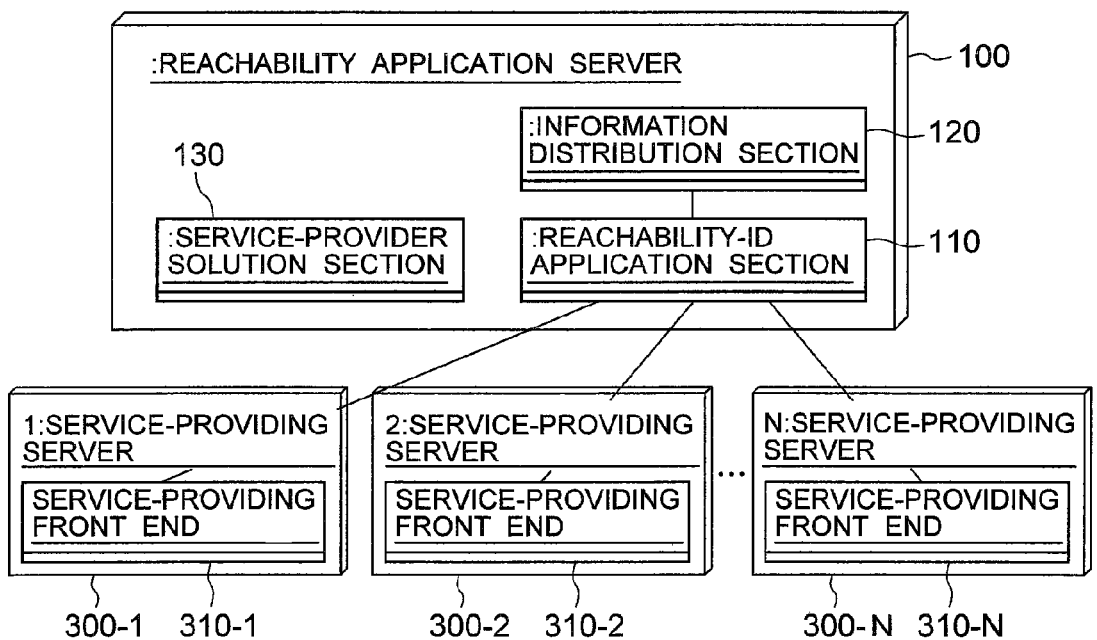
FIG. 5 is an explanatory chart exemplifying a case where the reachability-ID storage section stores therein a real ID, a reachability ID and the term of validity.
FIG. 6 is a block diagram exemplifying a reachability management system according to a second embodiment.
FIG. 7 is an explanatory chart exemplifying a case where the reachability-ID storage section stores therein the real ID, reachability ID and service ID.

The term of validity may be provided in the reachability ID. FIG. 5 is an explanatory chart exemplifying a case wherein the reachability-ID storage section 220 stores therein the real ID, reachability ID, and term of the validity. The reachability-ID application section 110 may update the reachability ID that has passed the term of validity among the reachability IDs stored in the reachability-ID storage section 220.

Embodiment 2

Next, a second embodiment of the present invention will be described. FIG. 6 is a block diagram exemplifying the reachability management system of the present embodiment. The reachability management system of the second embodiment includes service-providing servers 300-1, 300-2, . . . , 300-N instead of the service-providing server 300 in the first embodiment. The reachability application server 100 includes the reachability-ID application section 110, the information distribution section 120, and a service-provider solution section 130. The service-providing servers 300-1, 300-2, . . . , 300-N include service-providing front ends 310-1, 310-2, . . . , 310-N, respectively.

In the second embodiment, the reachability-ID application section 110 may access the plurality of service-providing servers 300-1, 300-2, ..., 300-N. The reachability-ID application section 110 may access the service-provider solution section 130. Note that FIG. 6 shows only the reachability application server 100 and service-providing servers 300-1, -2, and -N in the reachability management system.

The service-provider solution section 130 stores in advance a service-providing server ID, which allows identification of the service-providing server, in association with a service ID which allows identification of the service. The reachability application server 100 receives the service-use request including the service ID from the reachability terminal 10, for example.

The service-provider solution section 130 selects a service-providing server stored therein based on the service ID received, to judge which service-providing server should be accessed by the reachability-ID application section 110, and outputs to the reachability-ID application section 110 the address of service to be accessed.

For example, if the service ID "rescue123456" is input, the service-provider solution section 130 selects a service-providing server ID "http://www.example.com/" corresponding to the service ID "rescue123456". The service-provider solution section 130 outputs "http://www.example.com/rescue123456" to the reachability-ID application section 110 as an address of the service to be accessed.

The reachability-ID storage section 220 may store therein a set of the real ID, reachability ID, and service ID. FIG. 7 is an explanatory chart exemplifying a case where the reachability-ID storage section 220 stores the real ID, reachability ID, and service ID. For example, in an example of the first embodiment, an identity that represents the rescue service is stored as the service ID.

The reachability-ID management section 210 may generate a plurality of reachability IDs with respect to a single real ID. The reachability-ID management section 210 may generate a plurality of reachability IDs for a single real ID and a single service ID, to store the same in the reachability-ID storage section 220. FIG. 8 is an explanatory chart exemplifying a case where the reachability-ID storage section 220 stores therein a plurality of reachability IDs for a single real ID and a single the service ID.

The reachability-ID management section 210 may generate a reachability ID for each service with respect to a single real ID.

Embodiment 3

Next, a third embodiment of the present invention will be described. FIG. 9 is a block diagram exemplifying the reachability-ID management server 200 in the present embodiment. In the third embodiment, the reachability-ID management server 200 includes a reachability-ID management section 210, a reachability-ID storage section 220, and a reachability-ID-use-history management section 230.

The reachability-ID management section 210 is connected to the reachability-ID-use-history management section 230 for accessing thereto. For example, the reachability-ID-use-history management section 230 allows, for example, a storage device (not shown) to store therein as history data the reachability-ID generation request (acquisition request) and real-address acquisition request to the reachability-ID management server 200 from the reachability-ID application section 110.

Embodiment 4

Next, a fourth embodiment of the present invention will be described. FIG. 10 is a block diagram exemplifying the reachability management system of the present embodiment. In the fourth embodiment, the service-providing server 300 includes a service-providing front end 310, a contact-address management section 320, and a contact-address browse history 330. Note that FIG. 10 shows only the service-providing server 300, external service system 400, and reachability terminal 20 in the reachability management system.

The contact-address management section 320 is connected to the contact-address browse history 330 for accessing thereto. The contact-address management section 320 may allow the contact-address browse history 330 to store a series of use histories, such as the processings wherein the reachability terminal 20 used by the reachability user acquires the reachability ID from the contact-address management section 320. The contact-address browse history 330 is a storage device that stores therein the use history. The contact-address browse history 330 may be accessible from the outside. That is, the contact-address browse history 330 may have a section for receiving a browsing request of the use history stored therein. For example, it is possible to charge a fee based on the use history stored in the contact-address browse history 330.

Embodiment 5

Figure 11:
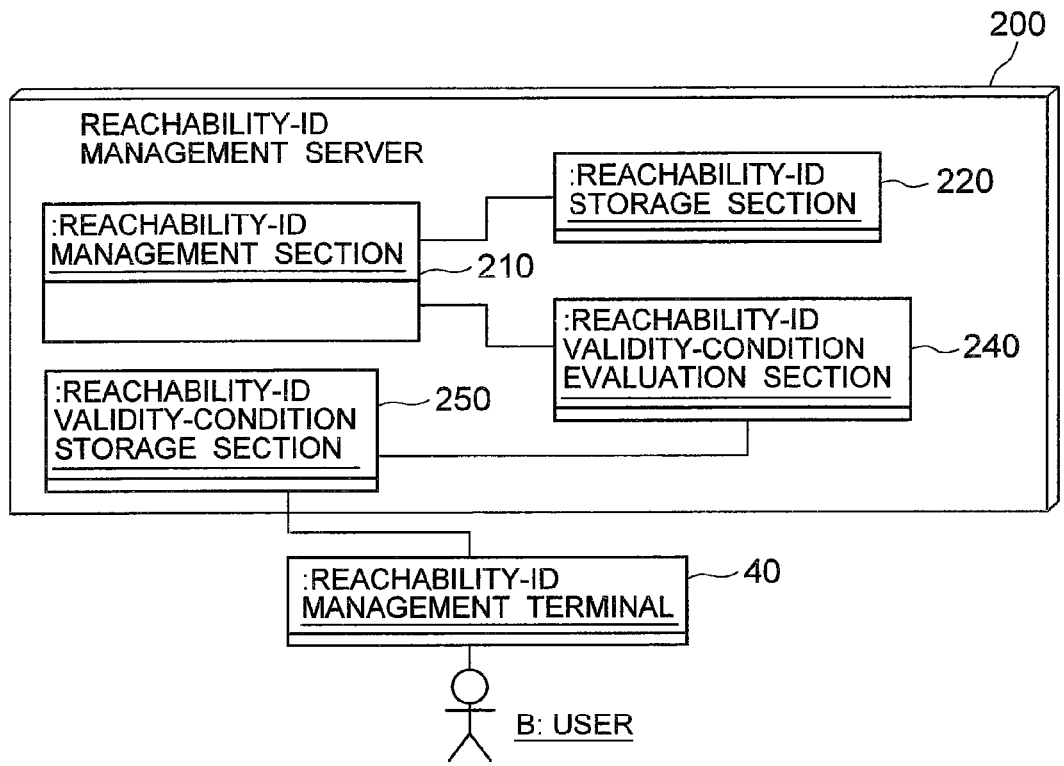
FIG. 11 is a block diagram exemplifying a reachability management system according to a fifth embodiment.

Next, a fifth embodiment of the present invention will be described with reference to the drawings. FIG. 11 is a block diagram exemplifying the reachability management system of the fifth embodiment. In the fifth embodiment, the reachability-ID management server 200 includes the reachability-ID management section 210, reachability-ID storage section 220, a reachability-ID validity-condition evaluation section 240, and a reachability-ID validity-condition storage section 250. FIG. 11 shows only the reachability-ID management server 200 and reachability-ID management terminal 40 in the reachability management system.

According to the fifth embodiment, the reachability ID is used based on the reachability-ID validity condition that shows the condition where the reachability ID can be used. The reachability-ID validity condition is an IF-THEN rule such as [IF C: reachability user, THEN permission of the real ID]. That is, the reachability-ID validity condition is a condition for the reachability user to be capable of communicating to the service client. For example, the reachability-ID application section 110 judges whether or not subsequent processings are to be performed based on the reachability-ID validity condition, if a request of contact to the service client including reachability ID is received.

The reachability-ID management section 210 is connected to the reachability-ID validity-condition evaluation section 240 for accessing thereto. The reachability-ID validity-condition evaluation section 240 is connected to the reachability-ID validity-condition storage section 250 for accessing thereto. The service provider can update the reachability-ID validity condition stored in the reachability-ID validity-condition storage section 250 by using the reachability-ID management terminal 40. A user other than the service provider may update the reachability-ID validity condition by using a terminal.

According to the fifth embodiment, the reachability can used while assuring the safety thereof, by setting the reachability-ID validity condition under the consent between the service client and the service provider. A reachability validity condition may be provided for each service. In addition, the reachability validity condition set for the service to be used may be checked when the service client uses the service.

Further, the reachability validity condition set for the service to be used may be updated when the service client uses the service.

Figure 12:
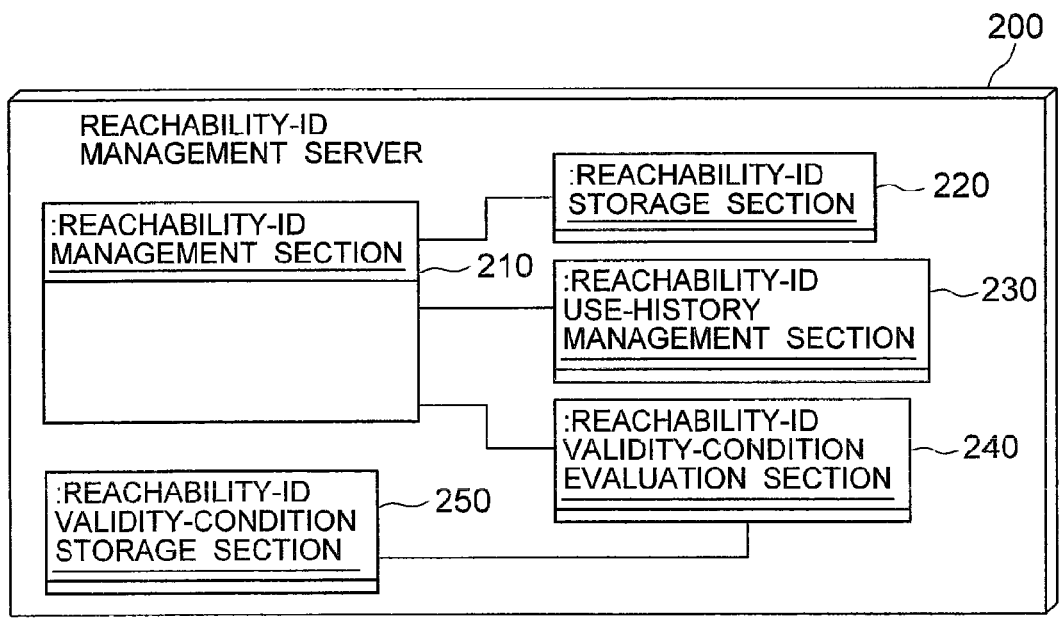
FIG. 12 is a block diagram exemplifying the reachability-ID management server.

A state description may be included in the reachability-ID validity condition. FIG. 12 is a block diagram exemplifying the reachability-ID management server 200. The reachability-ID management server 200 includes the reachability-ID management section 210, reachability-ID storage section 220, reachability-ID-use-history management section 230, reachability-ID validity-condition evaluation section 240, and reachability-ID storage section 250.

The reachability-ID management section 210 is connected to the reachability-ID-use-history management section 230 and reachability-ID validity-condition evaluation section 240 for accessing thereto. The reachability-ID validity-condition evaluation section 240 is connected to the reachability-ID validity-condition storage section 250 for accessing thereto.

Figure 13:
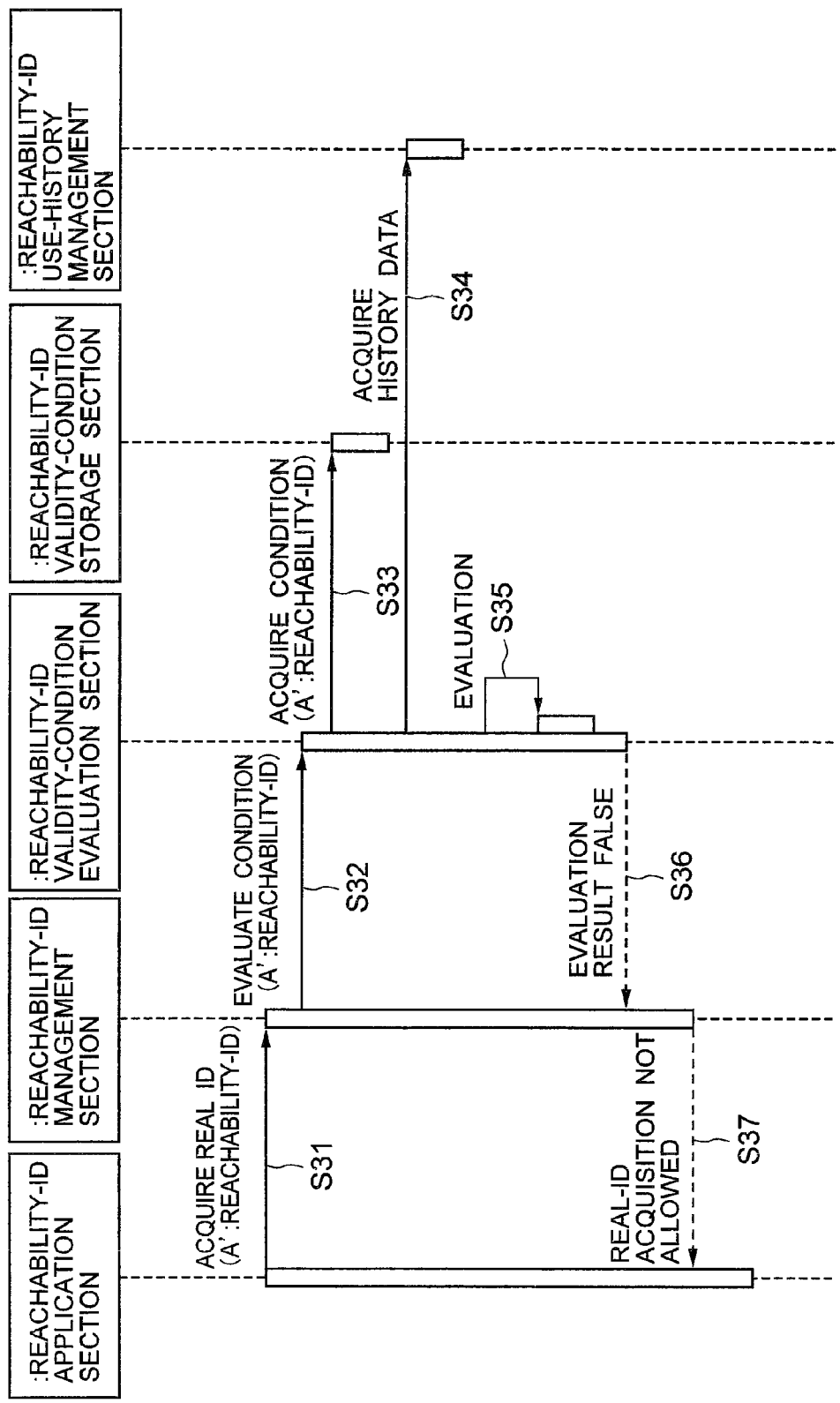
FIG. 13 is a sequence diagram exemplifying operation of the reachability-ID management server.

Next, operation of the reachability-ID management server 200 exemplified in FIG. 12 will be described. FIG. 13 is a sequence diagram exemplifying operation of the reachability-ID management server 200 of FIG. 12. The reachability-ID management section 210, upon receiving the real-ID acquisition request from the reachability-ID application section 110 (step S31), requests to the reachability-ID validity-condition evaluation section 240 the reachability ID and evaluation of the validity condition of the reachability ID (step S32).

The reachability-ID validity-condition evaluation section 240 acquires the reachability-ID validity condition in association with the reachability ID from the reachability-ID validity-condition storage section 250 (step S33). The reachability-ID validity-condition evaluation section 240 acquires history data from the reachability-ID-use-history management section 230 (step S34).

The reachability-ID validity-condition evaluation section 240 evaluates the reachability validity condition based on the reachability-ID validity condition and history data (step S35). The reachability-ID validity condition may be a restriction on the number of use times of the reachability ID, for example. FIG. 14 is an explanatory chart exemplifying the history data. For example, if the reachability-ID validity condition is [IF: the number of use times of reachability ID (3e977b1c3611a85fece041c55ac01ae3) exceeds three, THEN refusal of conversion to the real ID] and the history data is the data shown in FIG. 14, the result of evaluation is false. The reachability-ID validity-condition evaluation section 240 outputs the evaluation result to the reachability-ID management section 210 (step S36).

The reachability-ID management section 210 transmits to the reachability-ID application section 110 the evaluation result output from the reachability-ID validity-condition evaluation section 240 (step S37). In the above example, the reachability-ID management section 210 transmits the information representing refusal of the real-ID acquisition to the reachability-ID application section 110.

According to the above embodiment, the reachability user can contact to the service client while securing the safety of reachability to the service provider. The reachability ID can be updated to an arbitrary timing. The service client can control the reachability ID at an arbitrary timing to thereby intercept the contact from the service provider or reachability user. The reachability user can contact via the reachability management system to the service client that used the service provided by the service provider.

The operator of the reachability management system can collect the reachability fee from the service provider or reachability user by collecting the reachability-use history, for example. For example, a reachability provision fee and fee of message transmission to the service provider may be collected from the service provider and the reachability user, respectively.

The service provider can collect a fee of reachability acquisition by the service client from the reachability user, by collecting the reachability-use history. In a restaurant reservation service using the mobile terminal, for example, a guest of the restaurant can wait in a queue without disclosing the real ID. In addition, a staff of the restaurant can forward information as to reservation of the restaurant by using the reachability ID.

For example, in a loan consultation service, a consulter of the loan can consult on the loan without disclosing the real ID, and does not receive a contact from the loan company. The consulter of the loan can hand over his own reachability temporarily to the loan window.

For example, in a lost-article recovery service, a person who comes across to the lost article can bring the lost article and receive a reward thereof without disclosing the real ID. In addition, the person who lost the article can offer the reward without disclosing the identity.

Embodiment 6

A sixth embodiment of the present invention will be described. In the sixth embodiment and subsequent embodiments that are shown hereinafter, the reachability means the capability of reaching to a specific person or object, as in the first through fifth embodiments. A communication such as e-mail or telephone is a service using the reachability to the person. Services using the reachability to an object include a distribution of a program or data to a karaoke equipment or video device.

In the embodiments including the sixth embodiment and subsequent embodiments described hereinafter, the reachability ID is an "identity" delivered to the service provider, in order to guarantee the reachability to the service client. There are some delivery methods for the reachability ID. For example, a method of delivering the same whenever the service client issues a service-use request, a method of delivering the same for each combination of the service provider and the service client etc. are enumerated. In the latter case, only a single reachability ID is delivered for a plurality of service-use requests issued to the same service provider. In both the former and latter cases, a common reachability-ID is not delivered among the service providers.

In the embodiments including the sixth embodiment and subsequent embodiments described hereinafter, terms are defined as follows. The real ID is an "identity" delivered to every service client in the systems (e-mail system, telephone service, etc.) that realize the reachability. For example, the real ID is a telephone number, an e-mail address, an address etc. Business flow is a business process in a specific business. For example, in a restaurant reservation processing business, the business flow means the flow of processing from the starting point to the end point thereof, i.e., from receiving a reservation from the customer to preparation of a seat for the customer. Business-flow template is such that the business flow is realized along the state transition model. Hereinafter, the business-flow template may be abbreviated to read flow template.

A system that handles the reachability relating to the embodiments including the sixth embodiment and subsequent embodiments is described in each literature shown below. For example, Patent Publication-1 describes that the rescued side (reachability user) and the rescuing side (service client) directly exchange therebetween a contact via a radio.

In the system described in Patent Publication-1, the real ID of the service client is known by the reachability user due to the contracting. Therefore, unless the service client changes the real ID, there is a possibility of receiving the nuisance mail etc. from the reachability user. Since it is not easy to invalidate the real ID, the reachability cannot be cancelled even if the rescue is cancelled.

In the first embodiment through fifth embodiment, the system which provides the service provider with the reachability ID related with the real ID instead of the real ID. The service issues a request that requests the reachability of the service client to the system that controls the reachability using the reachability ID, to thereby assuring the anonymity of the service client. In addition, as the evaluation condition for the validity of the reachability ID, a value, such as "number of use times is less than three", and "validity date of use is before (2010 Jan. 1)" is set and evaluated, to limit the use of reachability by the service provider.

In the related service described in Non-Patent Literature-1, the real ID of service client is stored in the side of service-providing server (my boomerang). Therefore, there is a possibility that the service client may be hung around by the service-providing side (rescue service) unless the real ID is changed. Since it is not easy to invalidate the real ID, the reachability cannot be cancelled even if the my boomerang is cancelled.

In the related reachability control system described in each of the above literatures, evaluation of validity of the reachability ID is not performed in accordance with the business flow of the service. In addition, there is no common background of the communication enterprises (referred to as carriers hereinafter) that performs fine control of the reachability ID that closely relates to the service flow utilizing the information propriety (for example, real ID) of the carriers.

Therefore, in the related reachability control system described in each of above literatures, a fine control wherein a condition specific to the business is set and evaluated, and wherein if the condition is satisfied, the reachability is validated cannot be performed. For example, a fine control wherein a service client having a reachability ID "A" is provided with the reachability only when the service client is under subscription and stays in the site, i.e., the reachability is validated only when the service client needs the reachability or does not feel a trouble.

In addition, it is preferable to control the reachability to the service client so that the reachability is validated to the service provider only when the service client needs the same or only when the service client does not feel a trouble, or to assure whether or not the provision of the reachability can be provided while keeping the anonymity of the service client. For this purpose, the business flow is obtained and verified for each of the service providers.

In the sixth embodiment, the reachability ID of subscriber and the current state of the business flow are associated with each other, and the action or parameter that controls validity of the reachability is set in the business flow, whereby the control of reachability in accordance with the business flow can be performed automatically.

Hereinafter, a sixth embodiment will be described. In the present embodiment, it is assumed that the service provider is a restaurateur, service client is a subscriber of the carrier, and the operator that controls the reachability from the restaurateur to the subscriber is a carrier partner or the carrier.

Figure 15:
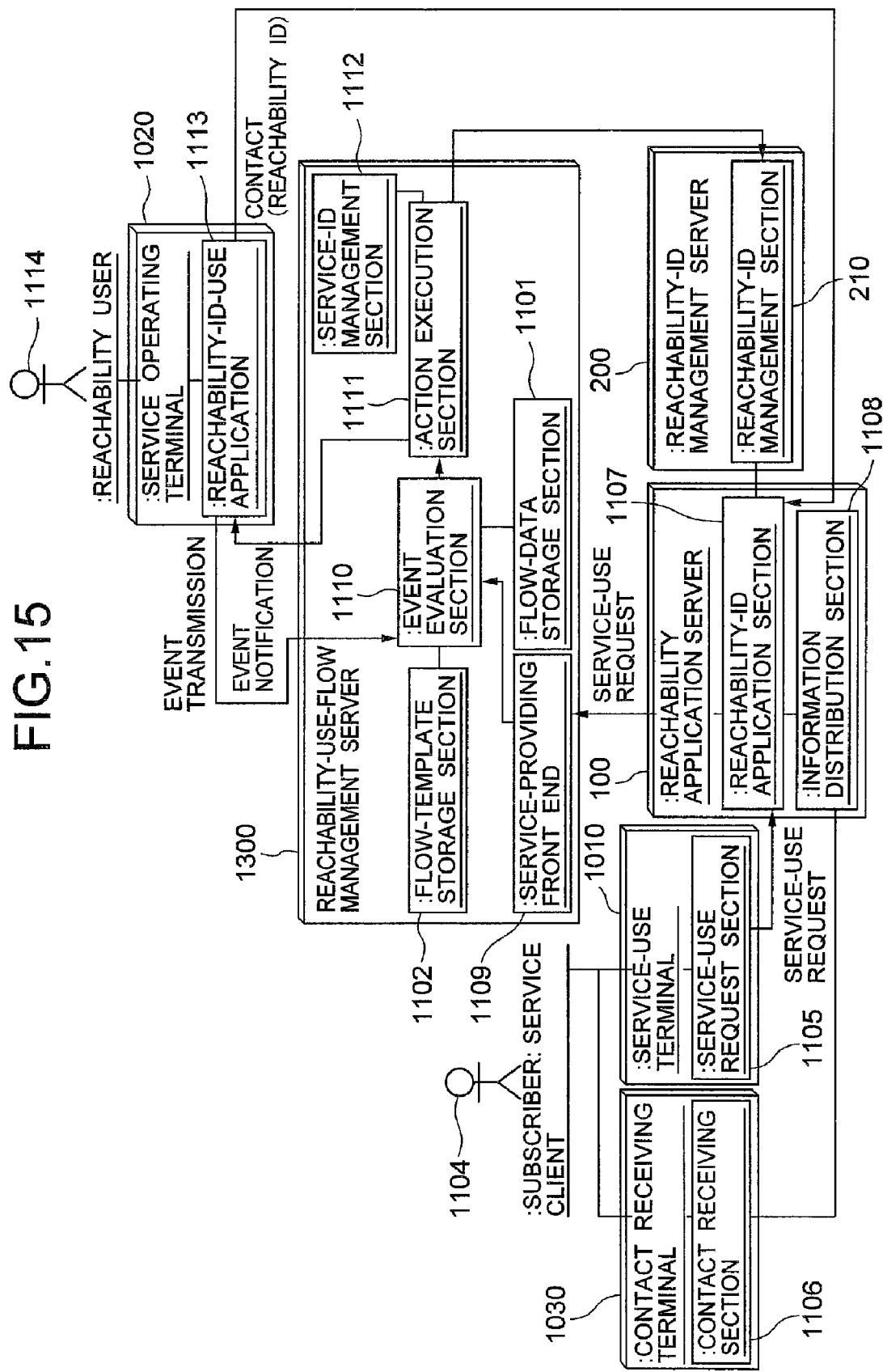
FIG. 15 is a block diagram exemplifying a reachability management system according to a sixth embodiment.

FIG. 15 is a block diagram exemplifying the reachability management system according to the sixth embodiment. The reachability management system includes a "service operating terminal 1020" operated by the restaurateur, "contact receiving terminal 1030" and "service-use terminal 1010" owned by the subscriber, "reachability application server 100", "reachability-ID management server 200", and "reachability-use-flow management server 1300" operated by the carrier partner or carrier.

The service-use terminal 1010, service-operating terminal 1020, contact receiving terminal 1030, reachability application server 100, reachability-ID management server 200, and reachability-use-flow management server 1300 are each realized by an information processor, such as a personal computer, that is run by a program. The service-use terminal 1010, service-operating terminal 1020, contact receiving terminal 1030, reachability application server 100, reachability-ID management server 200, and reachability-use-flow management server 1300 can be connected to the network of the carrier.

The service-use terminal 1010 and contact receiving terminal 1030 are used by the subscriber 1104. The service-use terminal 1010 includes a service-use request section 1105. The service-use request section 1105 has the function of transmitting the service-use request to the reachability application server 100. The service-use terminal 1010 is realized by a non-contact IC-card reader etc., for example.

The contact receiving terminal 1030 includes a contact receiving section 1106. The contact receiving section 1106 is a section that receives a contact from the reachability application server 100. The contact receiving section 1106 is realized by an e-mail receiving function, IM (instant message) client function etc., for example, and the contact receiving terminal 1030 is realized by a personal digital assistant having these functions.

The reachability application server 100 includes an information distribution section 1108 and a reachability-ID application section 1107. The information distribution section 1108 has the function of transmitting a message to the contact receiving section 1106 based on the real ID. The reachability-ID application section 1107 has the function of exchanging the real ID and reachability ID therebetween using the reachability-ID management section 210, and transmitting the service request to the service-providing front end 1109.

The reachability-ID management server 200 includes the reachability-ID management section 210.

The reachability-ID management section 210 stores therein a reachability-ID-validity management table, and has the function of returning the reachability ID and changing the validity of the reachability ID, in response to the reachability-ID acquisition request that uses the real ID as the key. The reachability-ID-validity management table will be described later.

The reachability-use-flow management server 1300 includes a service-providing front end 1109, a flow-data storage section 1101, a flow-template storage section 1102, an event evaluation section 1110, an action execution section 1111, and a service-ID management section 1112. The service-providing front end 1109 has the function of transmitting the service-providing request to the event evaluation section 1110 corresponding to the service ID upon receiving the service-providing request.

The service ID is an identity of the reachability-ID-use application 1113 described later. For example, the reachability-ID management server 200 may issue and manage the service ID. If the service provider provides a plurality of reachability-ID-use services, the service ID includes a plurality of service IDs.

The flow-data storage section 1101, event evaluation section 1110 and action execution section 1111 each store therein a service ID corresponding to themselves. The service ID thus stored may include a plurality of service IDs. The flow-data storage section 1101, event evaluation section 1110 and action execution section 1111 are created for each business-flow template. For example, if there are restaurant-A seat reservation service and a restaurant-B seat reservation service that use the flow template for restaurant seat reservation, those three sections are created for each seat reservation service. Note that the business-flow template is such that the business flow is realized in accordance with the state transition model, and may be abbreviated to "flow template" for description. The flow template will be described later.

The flow-data storage section 1101 stores therein the present-state management table for management thereof. The present state of flow is registered in the present-state management table in association with the reachability ID. Hereinafter, the information registered in the present-state management table may be referred to as flow data.

The event evaluation section 1110, upon receiving an event from the reachability-ID-use application 1113, determines the action to be executed based on the flow template stored in the flow-template storage section 1102 and the flow data stored in the flow-data storage section 1101. That is, the event evaluation section 1110 determines the action to be performed, based on the information in the event, flow template and flow data. Note "event" means an occurrence in the business flow, for example. The information representing an occurrence in the business flow may also be referred to simply as event. The event may represent the fact that "number of visitors amounts to 100" as the information of state, for example, or represents in another case the information "entry of a single visitor", for example.

The action execution section 1111 executes an action set up in the flow template based on the determination by the event evaluation section 1110. As an example of the action, a processing may be quoted that the reachability ID is effectively set valid or invalid with respect to the reachability-ID-validity management table that stored in the reachability-ID management section 210. The flow-template storage section 1102 stores therein the flow template table describing the business flow and manages the same. The flow template table will be described later.

The service-ID management section 1112 stores therein the service-ID management table describing the service ID and the contact address for each service. The service-ID management table will be described later. The service operating terminal 1020 includes the reachability-ID-use application 1113. The reachability-ID-use application 1113 has the function of receiving an event from the reachability-use-flow management server 1300, transmitting the event to the reachability-use-flow management server 1300, and requesting the reachability application server 100 to have a contact to the service client (subscriber in the present embodiment) by using the reachability ID.

The reachability-ID-use application 1113 may operate in a flow such that it starts and executes the action, as a trigger, at the event notification received from the reachability-use-flow management server 1300. As an example of the action, a request of contact directed to the subscriber who used reachability ID and made to the reachability application server 100 may be enumerated. The reachability-ID-use application 1113 of the service-operating terminal 1020 is typically used by the reachability user 1114.

FIG. 16 is an explanatory chart showing an example of registration of the present-state management table stored and managed by the flow-data storage section 1101 in the sixth embodiment. The present-state management table has at least the item of reachability ID and present state of the flow. More specifically, the present-state management table is stored in a storage device, such as a hard disk drive or memory, in the reachability-use-flow management server 1300.

FIG. 17 is an explanatory chart showing an example of registration in the flow template table stored and managed by the flow-template storage section 1102 in the sixth embodiment. In FIG. 17, a flow template table for the restaurant seat reservation is exemplified. The flow template table has the item of present state, condition, action, and post-transition state. As the value for action, a variable registered in the reachability-ID action table, which will be described later, is enumerated. The condition is, for example, information corresponding to the event. More specifically, the flow template table is stored in a storage device, such as a hard disk drive or memory, in the reachability-use-flow management server 1300.

FIG. 18 is an explanatory chart showing an example of registration of the reachability-ID action table in the sixth embodiment. The reachability-ID action table has the item of variable and action. It is preferred that actions (validity, invalidity, etc.) and parameters (number of times etc) that control the reachability ID be registered in the reachability-ID action table in association with the variables for the sake of facilitation of reading. Note that FIG. 18 exemplifies the case where only the actions are registered. The value registered in the reachability-ID action table may be substituted for the variable of the flow template table.

FIG. 19 is an explanatory chart showing an example of registration in the reachability-ID-validity management table stored and managed by the reachability-ID management section 210 in the sixth embodiment. The reachability-ID-validity management table has at least the item of real ID, reachability ID, and a validity flag. More specifically, the reachability-ID-validity management table is stored in a storage device, such as a hard disk drive or memory, in the reachability-ID management server 200.

FIG. 20 is an explanatory chart showing an example of registration of the service management table stored and managed by the service-ID management section. The service management table has at least the item of service ID and contact address of the reachability-ID-use application. This is used when the action execution section 1111 performs event notification to the reachability-ID-use application 1113. More specifically, the service management table is stored in a storage device, such as a hard disk drive or memory, in the reachability-use-flow management server 1300.

Next, operation of the sixth embodiment will be described. It is assumed that a business flow for restaurants (refer to FIG. 17) is set in the reachability-use-flow management server 1300. The business flow exemplified in FIG. 17 realizes a seat reservation service for the restaurants. For example, the doReachability( ) function, that is registered as the action, represents a program that causes the reachability-ID management section 1103 to execute the processing of updating the reachability-ID-validity management table. The doReachability( ) function has a reachability ID in the first argument, and has a value of the variable item of the reachability-ID action table (refer to FIG. 18) in the second argument. In the reachability-ID-validity management table, execution of the doReachability( ) function will execute the action corresponding to the variable specified as the second argument with respect to the validity flag associated with the reachability ID specified as the first argument.

A notify( ) function has a reachability ID in the first argument, and has a contact address of the notification destination in the second argument, and has a message content in the third argument. Execution of the notify( ) function will perform action which notifies the message of the third argument including the reachability ID specified in the first argument to the contact address of the second argument. In the following description, it is assumed that the service ID of the seat reservation of the restaurant is "restaurant1234".

Figure 21:
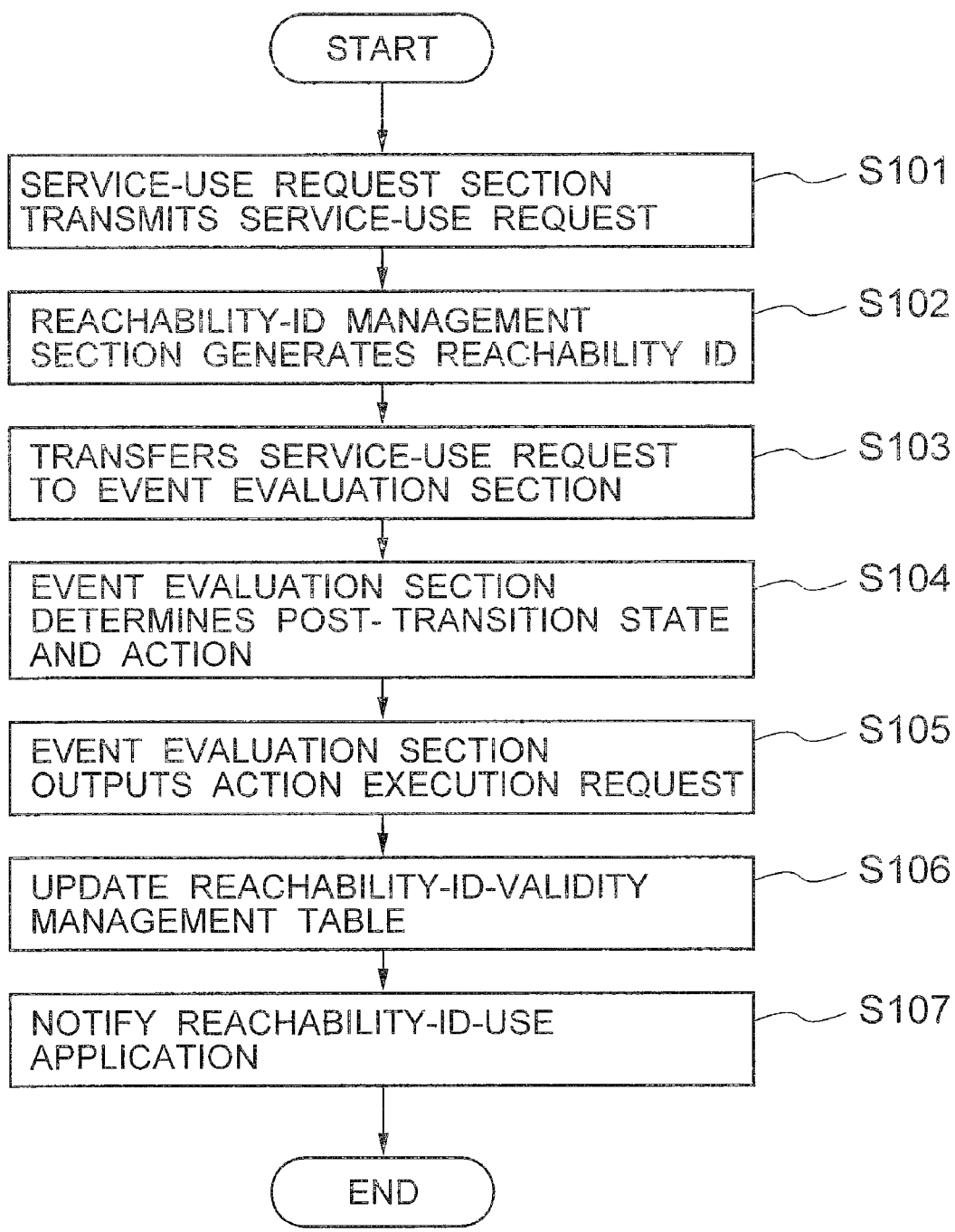
FIG. 21 is a flowchart showing operation of the reachability management system in a case where the subscriber requests provision of a service.

Hereinafter, an operation will be described wherein the subscriber performs a seat reservation request to the restaurateur by using the seat reservation service. FIG. 21 is a flowchart showing operation of the reachability management system in case where the subscriber requests provision of service. The subscriber 1104 reads the service ID written in the non-contact IC card attached to advertisement of the restaurant, for example, by using the service-use terminal 1010 (including the non-contact IC-card reader in this case), and performs operation of requesting the seat reservation service. Next, the service-use request section 1105 in the service-use terminal 1010 transmits a "service-use request" together with the real ID "tsuta@tsuta.com" of the service client and the service ID "restaurant1234" desired by the service client to the d reachability-ID application section 1107 by using a short-distance radio system (step S101).

The reachability-ID application section 1107, upon receiving the "service-use request", transmits the "reachability-ID acquisition request" together with the real ID of subscriber 1104 to the reachability-ID management section 210. The reachability-ID management section 210 generates and stores the reachability ID corresponding to the real ID of service client received, and transmits the reachability ID to the reachability-ID application section 1107 (step S102). Here, it is assumed that the reachability ID is "4d40a4adb5ada496d96610b0dd9f8042".

The reachability-ID application section 1107 transmits the "service-use request" together with the reachability ID and service ID of the subscriber 1104 to the service-providing front end 1109. The service-providing front end 1109, upon receiving the "service-use request", transmits the "service-use request" to the event evaluation section 1110 of the service corresponding to the service ID (step S103).

The event evaluation section 1110 first extracts the reachability ID of subscriber 1104 from the "service-use request", and adds a row of the reachability ID and a default state of the post-transition destination in the present-state management table (refer to FIG. 16(a)). The event evaluation section 1110 determines the post-transition state and action based on the present-state management table (refer to FIG. 16(a)) in the flow-data storage section 1101 and the restaurant flow template (refer to FIG. 17) in the flow-template storage section 1102 (step S104). Since the present state is "during receiving reservation" and the condition is "service-use request", the "completion of reservation request" is selected as the post-transition state, and "doReachability (reachabilityId, A)" and "notification is received from "notify(reachabilityId, to, reachabilityId+");" are selected as the action.

The event evaluation section 1110 updates the present state in the present-state management table to "completion of reservation request" (refer to FIG. 16(b)). The event evaluation section 1110 outputs information representing the action determined in step S104, and an action-execution request together with the reachability ID to the action execution section 1111 (step S105). In this case, the action-execution request includes "doReachability (reachabilityId, A)" "notification of reservation is received from "notify(reachabilityId, to, reachabilityId+");" and reachability ID "4d40a4adb5ada496d96610b0dd9f8042".

The action execution section 1111 performs "doReachability (reachabilityId, A)". More specifically, the action execution section 1111 outputs an update request for the reachability-ID-validity management table and reachability ID "4d40a4adb5ada496d96610b0dd9f8042" to the reachability-ID management section 210. In this case, the updating means validating of the reachability ID "4d40a4adb5ada496d96610b0dd9f8042" managed by the reachability-ID management section 210. The reachability-ID management section 210 updates the reachability-ID-validity management table (step S106). As the result of updating, the reachability-ID-validity management table is such that shown in FIG. 19(a) in this case.

Subsequently, the action execution section 1111 executes "reservation request is received from "notify(reachabilityId, to, reachabilityId+"". The action execution section 1111 extracts the contact address of the reachability-ID-use application 1113 corresponding to the service ID "restaurant1234" from the service-ID management section 1112, and notifies the event including the reachability ID to the extracted contact address (step S107). In this case, reachability ID is "4d40a4adb5ada496d96610b0dd9f8042", the contact address is "restaurant1234@example.com" and the message is "reservation request is received from "4d40a4adb5ada496d96610b0dd9f8042"". The reachability-ID-use application 1113 saves the received reachability ID.

Figure 22:
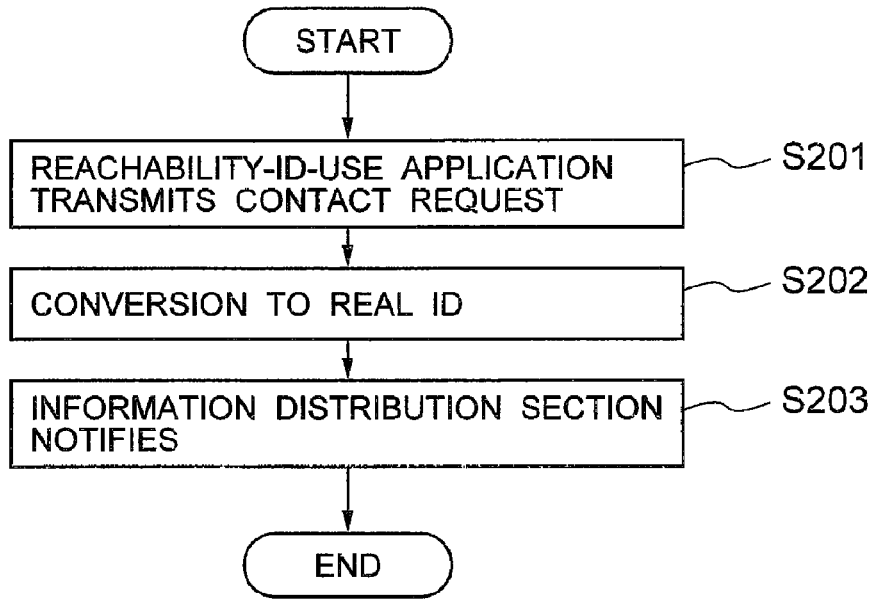
FIG. 22 is a flowchart showing operation of the reachability management system in a case where the reachability user contacts to the subscriber.

Next, operation of the restaurateur will be described in the case of contacting to the subscriber after the subscriber's seat is prepared in the restaurant. FIG. 22 is a flowchart showing operation of the reachability management system in a case where the reachability user contacts to the subscriber.

The reachability user 1114 of restaurant-A uses the reachability-ID-use application 1113 in the service-use terminal 1010, to transmit a request of contact to the subscriber 1104 including reachability ID "4d40a4adb5ada496d96610b0dd9f8042" to the reachability-ID application section 1107 (step S201). In this case, the reachability ID included in the contact request is used in order to specify the service client (subscriber 1104) of the addressee of reachability communication, as well as to perform identity verification on the restaurant side when the service client appears in the restaurant.

The reachability-ID application section 1107 tries conversion from the reachability ID to the real ID by using the reachability-ID management section 210 (step S202). Since "4d40a4adb5ada496d96610b0dd9f8042" is valid in this case (refer to FIG. 19(a)), the conversion to the real ID is valid. The above reachability ID corresponds to the real ID "tsuta@tsuta.com" (refer to FIG. 19(a)). The reachability-ID application section 1107 transmits to the information distribution section 1108 a request of contact to the subscriber 1104 and the real ID "tsuta@tsuta.com".

The information distribution section 1108 communicates to the contact receiving section 1106 of the contact receiving terminal 1030 (step S203). The subscriber 1104 receives a communication as to the completion of reservation request including reachability ID "4d40a4adb5ada496d96610b0dd9f8042" as the number for identity verification from the restaurant-A via the information distribution section 1108. The communication may be by e-mail, for example.

Figure 23:
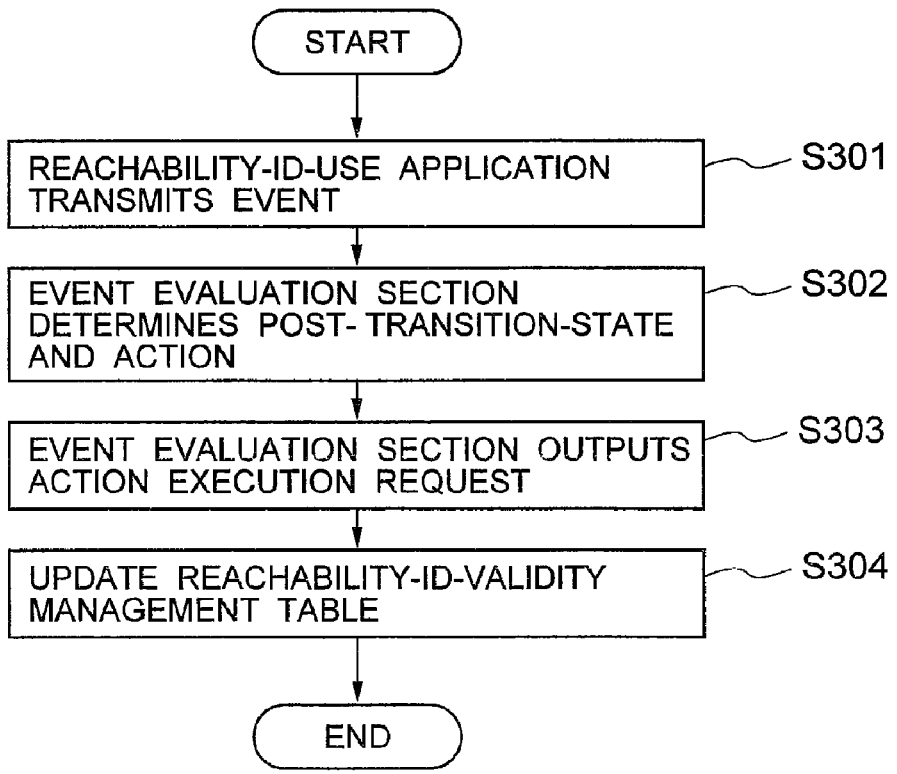
FIG. 23 is a flowchart showing operation of the reachability management system in the case of occurrence of an event.

Next, the processing will be described in a case where the subscriber 1104 who received the communication of completion of the seat reservation appears in the restaurant. FIG. 23 is a flowchart showing operation of the reachability management system upon occurrence of an event. Hereinafter, the case of occurrence of the event that the subscriber appears in the restaurant will be described as an example.

The reachability user 1114 of restaurant-A checks the reachability ID presented by the subscriber 1104, in order to verify that the subscriber appearing in the restaurant is the very subscriber 1104 that has reserved. As the method for verification, it may be considered that the mail describing the reachability-ID "4d40a4adb5ada496d96610b0dd9f8042" and presented by the subscriber 1104 is visually compared against the reachability ID saved in the reachability-ID-use application 1113. The reachability user 1114 of restaurant-A transmits the event "reachabilityId appears in the store" together with the reachability ID to the event evaluation section 1110 by using the reachability-ID-use application 1113 (step S301).

The event evaluation section 1110 determines the post-transition state and action based on the present-state management table (refer to FIG. 16(*b*)) in the flow-data storage section 1101 and the restaurant flow template (refer to FIG. 17) in the flow-template storage section 1102 (step S302). Here, since the present state is "completion of reservation request", in the case of receiving the event "reachabilityId, "completion of appearance" is selected as the post-transition state, and "doReachability (reachabilityId, B)" is selected as the action.

The event evaluation section 1110 updates the present state in the present-state management table to "completion of appearance" (refer to FIG. 16(*c*)). In this case, since the action "invalid" is registered with respect to the variable B in the reachability-ID action table (refer to FIG. 18), the action that invalidates reachability ID "4d40a4adb5ada496d96610b0dd9f8042" is executed upon selection of doReachability( ).

The event evaluation section 1110 outputs an action-execution request to the action execution section 1111 (step S303). In this case, the action-execution request includes "doReachability (reachabilityId, B)" and reachability ID "4d40a4adb5ada496d96610b0dd9f8042". The action execution section 1111 executes "doReachability (reachabilityId, B)". More specifically, the action execution section 1111 transmits an update request for the reachability-ID-validity management table together with the reachability ID to the reachability-ID management section 210. In this case, the updating means invalidation of reachability ID "4d40a4adb5ada496d96610b0dd9f8042". The reachability-ID management section 210 updates the reachability-ID-validity management table (step S304). As the result of updating in this case, the reachability-ID-validity management table is that shown in FIG. 19(*b*).

At this stage, since the reachability ID is invalidated, even if the reachability-ID-use application 1113 tries to communicate to the subscriber 1104 by using the reachability ID "4d40a4adb5ada496d96610b0dd9f8042", the reachability-ID management section 210 does not apply conversion from the reachability ID to the real ID. That is, communication from the reachability-ID-use application 1113 to the subscriber is not successful.

Next, operation in a case where the subscriber leaves an article behind in the restaurant and the restaurant side tries to communicate to the subscriber about the left article. Occurrence of an event that the subscriber left the article behind will be described first as an example with reference to FIG. 23. The reachability user 1114 of restaurant-A finds the article of subscriber 1104. It is assumed that whether or not the left article belongs to the subscriber 1104 is judged from the seat number on which the article is left behind, for example. The reachability user 1114 uses the reachability-ID-use application 1113, to transmit an event "reachability ID "4d40a4adb5ada496d96610b0dd9f8042" left article behind" to the event evaluation section 1110 (step S301).

The event evaluation section 1110 determines the post-transition state and action based on the present-state management table (refer to FIG. 16(*c*)) in the flow-data storage section 1101 and the restaurant flow template (refer to FIG. 17) in the flow-template storage section 1102 (step S302). Here, since the present state upon receiving the event "reachabilityId left" is "completion of appearance", "end" is selected as the post-transition state, and "doReachability (reachabilityId, A)" is selected as the action.

The event evaluation section 1110 updates the present state in the present-state management table to "end" (refer to FIG. 16 (*d*)). In this case, since action "valid" is registered with respect to the variable A in the reachability-ID action table (refer to FIG. 18), selection of doReachability( ) causes execution of the action that validates reachability ID "4d40a4adb5ada496d96610b0dd9f8042". The event evaluation section 1110 outputs an action-execution request to the action execution section 1111 (step S303). In this case, the action-execution request includes "doReachability (reachabilityId, A)" and reachability ID "4d40a4adb5ada496d96610b0dd9f8042".

The action execution section 1111 executes "doReachability (reachabilityId, A)". More specifically, the action execution section 1111 transmits an update request for the reachability-ID-validity management table together with the reachability ID to the reachability-ID management section 210. In this case, the updating means validation of reachability ID "4d40a4adb5ada496d96610b0dd9f8042". The reachability-ID management section 210 updates the reachability-ID-validity management table (step S304). As the result of updating in this case, the reachability-ID-validity management table is that shown in FIG. 19(*a*).

Next, operation of the reachability management system in a case where the reachability user communicates to the subscriber will be described. Hereinafter, the case where the reachability user communicates the fact that the subscriber left an article behind will be described as an example with reference to FIG. 22.

The reachability user 1114 of restaurant-A uses the reachability-ID-use application 1113 in the service-use terminal 1010, to transmit a request of contact to the subscriber 1104 including the reachability ID "4d40a4adb5ada496d96610b0dd9f8042" to the reachability-ID application section 1107 (step S201).

The reachability-ID application section 1107 tries the conversion from the reachability ID to the real ID by using the reachability-ID management section 210 (step S202). Since "4d40a4adb5ada496d96610b0dd9f8042" is valid in this case (refer to FIG. 19(*a*)), the conversion to the real ID is valid. The reachability-ID application section 1107 transmits the request of contact to the subscriber 1104 together with the real ID to the information distribution section 1108. The information distribution section 1108 communicates to the contact receiving section 1106 in the contact receiving terminal 1030. More specifically, the subscriber 1104 receives communication of the left article via the information distribution section 1108 (step S203). The communication may be by e-mail, for example.

In general, the height of reaching probability of data, speed of reaching time etc. are the indexes of a superior reachability. In the sixth embodiment, the control that validates reachability to the service client for the service provider only when the service client needs the same, or only when the service client does not feel a trouble, and provision of the reachability while assuring the anonymity of the service client are also the indexes of the superior reachability.

According to the sixth embodiment, validity evaluation of the reachability ID in accordance with the flow of service prevents use of the reachability ID for the purpose that neither the carrier nor the service client intends. Since the reachability-use-flow management server 1300 verifies the business flow supplied, it is possible to guarantee that there is no use of the reachability ID for the purpose that neither the carrier nor the service client intends. Thus, the reachability ID can be provided to the reachability ID user for usage thereof.

According to the sixth embodiment, the reachability is set in accordance with the business-flow template. Due to use of the business template, it is possible for the user to set a reachability for each reachability-ID-use application 1113, or to check the condition. The carrier or ISP can prevent the service-providing side from transmitting a troublesome message (SPAM) by the service-providing side to the user on behalf of the user. The business template can manage the action-starting condition, such as the reachability ID including "notification", validity, and invalidity, in a wider range of variation.

Embodiment 7

Next, a seventh embodiment of the present invention will be described. In the present embodiment, a plurality of service providers manage the business flow in cooperation by generating and deleting the reachability in accordance with the business flow. In the example shown below, the number of service providers is two; a loan company and a third-party audit company. It is assumed that the service ID of loan company is "loan1234", and the service ID of the third-party audit company is "audit1234".

Figure 24:
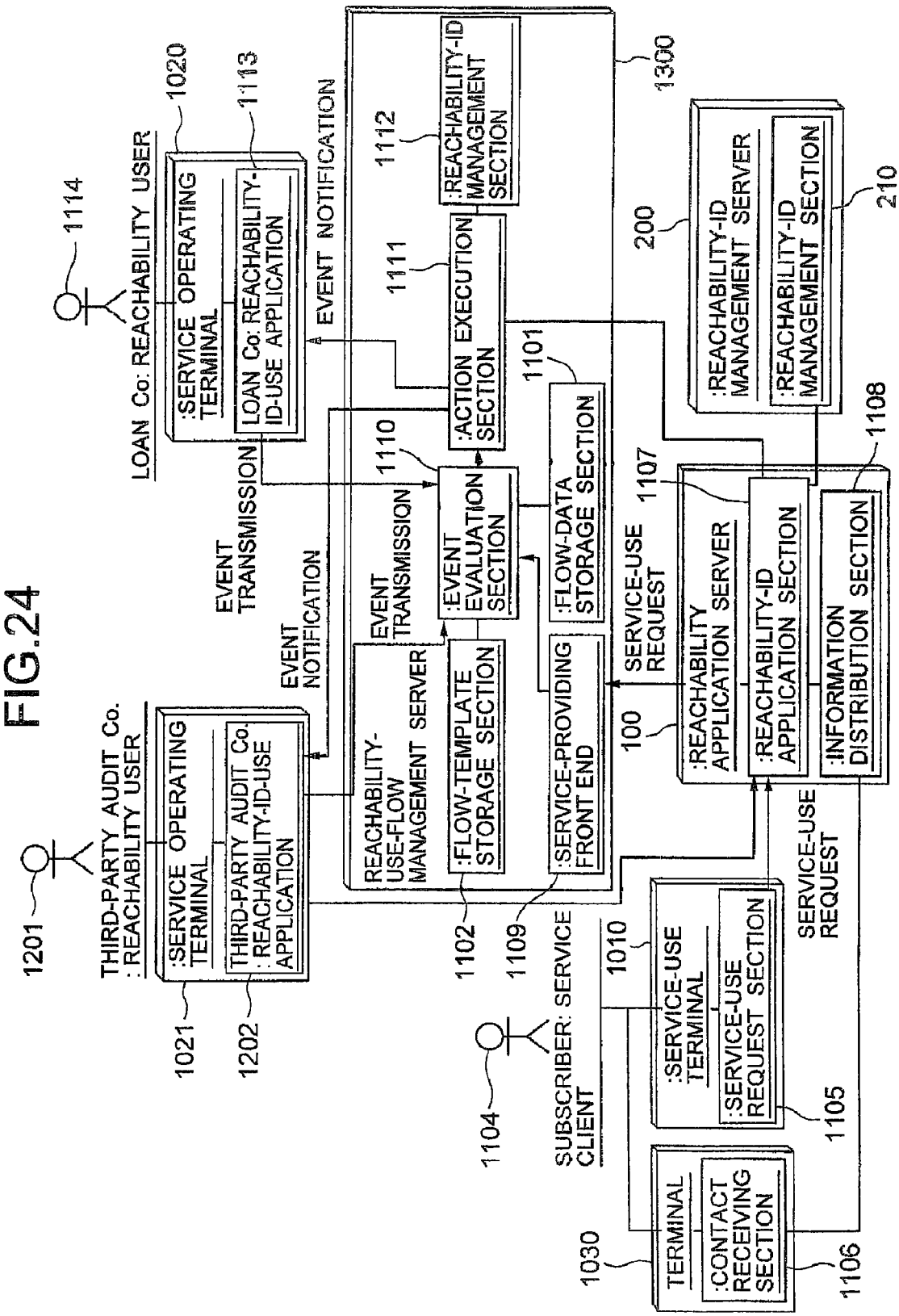
FIG. 24 is a block diagram exemplifying a reachability management system according to a seventh embodiment.

FIG. 24 is a block diagram exemplifying the reachability management system according to the seventh embodiment. FIG. 24 is obtained by extending FIG. 15. Note that the elements similar to those in the sixth embodiment are denoted by reference numerals similar to those in FIG. 15, and omitted for the description. In FIG. 24, a concrete example of description after ":" is shown by description before ":". For example, the loan company as the reachability user is denoted by "loan company: reachability user".

In the seventh embodiment, a service-operating terminal 1021 is provided in addition to the configuration of the sixth embodiment. The service operating terminal 1021 includes a "third-party audit company: reachability-ID-use application 1202". The "third-party audit company: reachability user 1201" uses the "third-party audit company: reachability-ID-use application 1202". The reachability-ID-use application 1202, upon receiving an audit request, uses the reachability ID to communicate to the subscriber and perform identity verification.

The "third-party audit company: reachability-ID-use application 1202" has the function of receiving the audit request of the subscriber corresponding to the reachability ID from the reachability-use-flow management server 1300, returning the audit result to the reachability-use-flow management server 1300, and communicating to the subscriber via the reachability application server 100.

FIG. 25 is an explanatory chart showing an example of registration of the present-state management table in the seventh embodiment. The present-state management table includes the item of at least the reachability ID and present state of the flow. FIG. 26 is an explanatory chart showing an example of registration of the flow template table in the seventh embodiment. In FIG. 26, a loan-contract-business-flow template table is exemplified. It is assumed that a loan-contract-business flow is set in the reachability-use-flow management server 1300.

FIG. 27 is an explanatory chart showing an example of registration of the reachability-ID action table in the seventh embodiment, wherein the action of generating and deleting is added in association with variables C and D in the reachability-ID action table shown in FIG. 27, in addition to the actions in the reachability-ID action table (refer to FIG. 18) in the sixth embodiment.

FIG. 28 is an explanatory chart showing an example of registration in the reachability-ID-validity management table in the seventh embodiment. The reachability-ID-validity management table shown in FIGS. 28(*a*) and 28(*b*) is obtained by extending the reachability-ID-validity management table (refer to FIGS. 19(*a*) and 19(*b*)) in the sixth embodiment. A reachability-ID that is associated with the same real ID as the item "reachability ID" is set for the item "reachability ID2".

Next, operation of the subscriber requesting a loan to the loan company in the seventh embodiment will be described with reference to FIG. 21. The subscriber 1104 uses the service-use terminal 1010 (including a non-contact IC-card reader, in this case) to read the service ID written in the non-contact IC card attached onto the advertisement of the loan company, for example, and to perform processing of requesting the loan. Subsequently, the service-use request section 1105 in the service-use terminal 1010 transmits a "service-use request" together with the own real ID and service ID (loan1234) to the reachability-ID application section 1107 (step S101).

The reachability-ID application section 1107 transmits a "reachability-ID acquisition request" together with the real ID of subscriber 1104 to the reachability-ID management section 210, upon receiving the "service-use request". The reachability-ID management section 210 generates and saves the reachability ID corresponding to the real ID of service client received, and transmits the reachability ID to the reachability-ID application section 1107 (step S102). Here, it is assumed that reachability ID is "4d40a4adb5ada496d96610b0dd9f8042".

The reachability-ID application section 1107 transmits a "service-use request" together with the reachability ID of subscriber 1104 and the service ID to the service-providing front end 1109. The service-providing front end 1109 transmits the "service-use request" to the event evaluation section 1110 corresponding to the service ID, upon receiving the "service-use request" (step S103).

The event evaluation section 1110 first extracts the reachability ID of subscriber 1104 from the "service-use request", and adds the row of the reachability ID and default post-transition state in the present-state management table (refer to FIG. 25(*a*)). The event evaluation section 1110 determines the post-transition state and action based on the present-state management table (refer to FIG. 25(*a*)) in the flow-data storage section 1101 and the loan-flow template (refer to FIG. 26) in the flow-template storage section 1102 (step S104). Here, since the present state is "during receiving of loan request" and the condition is "loan request", the "during preparation of loan" is selected as the post-transition state, and "doReachability (reachabilityId1, A)" and "loan request is received from "notify(reachabilityId1, to1, reachabilityId1+");" are selected as the action.

The doReachability( ) function has a reachability ID in the first argument, and has a value for the variable item in the reachability-ID action table in the second argument. In this case, "4d40a4adb5ada496d96610b0dd9f8042" is substituted for the first argument, and A is substituted for the second argument. In the reachability-ID-validity management table, selection of the doReachability( ) function causes execution of the action corresponding to the variable specified as the second argument with respect to the validity flag associated with the reachability ID specified as the first argument. That is, in this case, execution of action of validating "4d40a4adb5ada496d96610b0dd9f8042" is performed.

The notify( ) function has a reachability ID in the first argument, has the contact address of the notification destination in the second argument, and has the message content in the third argument. In this case, "4d40a4adb5ada496d96610b0dd9f8042" is substituted for the first argument, and "sip:loan1234@aaa.com" is substituted for the second argument. Selection of the notify( ) function causes execution of action of communicating the message of the third argument including the reachability ID specified as the first argument to the contact address of the second argument.

The event evaluation section 1110 updates the present state in the present-state management table to "during preparation of loan" (refer to FIG. 25(b)). The event evaluation section 1110 outputs an action-execution request to the action execution section 1111 (step S105). In this case, the action-execution request includes "doReachability (reachabilityId1, A)", "loan request is received from "notify (reachabilityId1, to1, reachabilityId1+");", reachability ID "4d40a4adb5ada496d96610b0dd9f8042", and notification destination "sip:loan1234@aaa.com".

The action execution section 1111 executes "doReachability (reachabilityId1, A)". More specifically, the action execution section 1111 issues the update request for the reachability-ID-validity management table together with reachability ID "4d40a4adb5ada496d96610b0dd9f8042" to the reachability-ID management section 210". In this case, the updating means validating of reachability ID "4d40a4adb5ada496d96610b0dd9f8042". The reachability-ID management section 210 updates the reachability-ID-validity management table (step S106). As the result of updating in this case, the reachability-ID-validity management table is that shown in FIG. 28(a).

Subsequently, the action execution section 1111 executes "loan request is received from "notify (reachabilityId1, to1, reachabilityId1+");". The action execution section 1111 extracts the contact address of reachability-ID-use application 1113 from the service-ID management section 1112, and notifies the event that includes the reachability ID in the extracted contact address (step S107). In this case, the reachability ID is "4d40a4adb5ada496d96610b0dd9f8042", the contact address is "sip:loan1234@aaa.com" and the message is "loan request is received from "4d40a4adb5ada496d96610b0dd9f8042". The reachability-ID-use application 1113 saves the received reachability ID.

Next, operation in a case where the loan company entrusts an audit to the third-party audit company as to whether or not the subscriber can pay back the loan will be described. Occurrence of the event of entrusting the audit request to the third-party audit company will be described as an example with reference to FIG. 23. The "loan company: reachability-ID-use application 1113" transmits the "audit request" event together with the reachability ID "4d40a4adb5ada496d96610b0dd9f8042" to the event evaluation section 1110 (step S301).

The event evaluation section 1110 determines the post-transition state and action based on the present-state management table (refer to FIG. 25(b)) in the flow-data storage section 1101 and the loan-flow template (refer to FIG. 26) in the flow-template storage section 1102 (step S302). Here, since the present state is "during preparation of loan", the "during audit" is selected as the post-transition state and "doReachability (reachabilityId1, C)" is selected as the action, upon receiving the "audit request" event.

The event evaluation section 1110 updates the present state in the present-state management table to "during audit" (refer to FIG. 25(c)). In this case, action "generation" is registered to variable C in the reachability-ID action table (refer to FIG. 27). Therefore, upon selection of doReachability( ), the second argument, which is C, causes action that generates the reachability ID for releasing to the new third-party audit company. The event evaluation section 1110 outputs an action-execution request to the action execution section 1111 (step S303). In this case, the action-execution request includes "doReachability (reachabilityId1, C)" and reachability ID "4d40a4adb5ada496d96610b0dd9f8042".

The action execution section 1111 executes "doReachability (reachabilityId1, C)". More specifically, the action execution section 1111 transmits an update request for the reachability-ID-validity management table together with the reachability ID to the reachability-ID management section 210. In this case, the updating means generation of new reachability ID associated with the real ID corresponding to reachability ID "4d40a4adb5ada496d96610b0dd9f8042". The reachability-ID management section 210 updates the reachability-ID-validity management table (step S304). As the result of updating in this case, the reachability-ID-validity management table is that shown in FIG. 28(b).

The action execution section 1111 also executes "request of loan audit to "notify (reachabilityId2, to2, reachability Id2+")". In this case, the reachabilityId2 is newly generated "5d40a6adb6ada596d96610b1de9f9053" (refer to FIG. 28(b)), and to2 is contact address "audit1234@bbbb.com" (refer to FIG. 20) of the "third-party audit company: reachability-ID-use application 1202". The "third-party audit company: reachability-ID-use application 1202" saves the received reachability ID "5d40a6adb6ada596d96610b1de9f9053".

Subsequently, the third-party audit company contacts to the subscriber by using the newly issued reachability ID, to perform identity verification. Hereinafter, the case where the third-party audit notifies identity verification of the subscriber will be described as an example with reference to FIG. 22. The "third-party audit company: reachability user 1201" uses the "third-party audit company: reachability-ID-use application 1202", to transmit a request of contact to the subscriber 1104 including reachability ID "5d40a6adb6ada596d96610b1de9f9053" to the reachability-ID application section 1107 (step S201).

The reachability-ID application section 1107 uses the reachability-ID management section 210 (step S202), to try conversion of the reachability ID into the real ID. Since the "5d40a6adb6ada596d96610b1de9f9053" is valid in this case (refer to FIG. 28(b)), the conversion to the real ID is valid. In addition, the above reachability ID corresponds to real ID "tsuta@tsuta.com" (refer to FIG. 28(b)). The reachability-ID application section 1107 transmits a request of contact to the subscriber 1104 together with the real ID to the information distribution section 1108.

The information distribution section 1108 contacts to the contact receiving section 1106 in the contact receiving terminal 1030 (step S203). The contact may be by telephone call between the third-party audit company and the subscriber via, for example, the telephone intermediation of the information distribution section 1108.

Next, operation in a case where the third-party audit company reports the audit result will be described. The case where the event of rejection by the audit occurs will be described as an example with reference to FIG. 23. The "third-party audit company: reachability user 1201" uses the "third-party audit company: reachability-ID-use application 1202", to transmit the event "rejected by the audit" together with reachability ID "5d40a6adb6ada596d96610b1de9f9053" to the event evaluation section 1110 (step S301).

The event evaluation section 1110 determines the post-transition state and action based on the present-state management table (refer to FIG. 25(c)) in the flow-data storage section 1101 and the loan-flow template (refer to FIG. 26) in the flow-template storage section 1102 (step S302). Here, since the present state is "during audit", reception of the event "rejection by the audit" causes selection of "end" as the post-transition state and selection of "doReachability (reachabilityId2, D)" as the action.

The event evaluation section 1110 updates the present state in the present-state management table to the "end" (refer to FIG. 25 (d)). In this case, action "deletion" is registered to variable D in the reachability-ID action table (refer to FIG. 27). Therefore, selection of doReachability( ) causes execution of the action that deletes reachability ID "5d40a6adb6ada596d96610b1de9f9053". The event evaluation section 1110 outputs an action-execution request to the action execution section 1111 (step S303). In this case, the action-execution request includes the "doReachability (reachabilityId2, D)" and reachability ID "5d40a6adb6ada596d96610b1de9f9053".

The action execution section 1111 executes "doReachability (reachabilityId2, D)". More specifically, the action execution section 1111 transmits an update request for the reachability-ID-validity management table together with the reachability ID to the reachability-ID management section 210. In this case, the updating means deletion of reachability ID "5d40a6adb6ada596d96610b1de9f9053". The reachability-ID management section 210 updates the reachability-ID-validity management table (step S304). As the result of updating in this case, the reachability-ID-validity management table is that shown in FIG. 28(a).

At this stage, even if the "third-party audit company: reachability-ID-use application 1202" tries to contact to the subscriber 1104 by using reachability ID "5d40a6adb6ada596d96610b1de9f9053", the reachability-ID management section 210 does not execute conversion to the real ID and thus the contact is impossible due to deletion of the reachability ID.

As described heretofore, according to the above seventh embodiment, due to the generation and deletion of the reachability ID in accordance with the business flow, a plurality of service providers can handle the business flow in cooperation.

Embodiment 8

Next, an eighth embodiment of the present invention will be described. In the present embodiment, a number of execution times may be provided as the term of validity, upon validating the reachability ID in the sixth embodiment. The reachability-ID management section 210 counts up the conversion from the reachability ID to the real ID, and if the count is below the number of valid times, executes the conversion from the reachability ID to the real ID.

FIG. 29 is an explanatory chart showing an example of registration of the reachability-ID action table in the eighth embodiment. In the eighth embodiment, the action and number of times are set in association with the variable in the reachability-ID action table. The "number of times" set in the reachability-ID action table is a parameter set for the action that is set "valid", for example. For example, the reachability-ID management section 210, upon updating the validity flag in the reachability-ID-validity management table to "valid", registers a number of times "3" as the parameter. The reachability-ID management section 210, upon converting the reachability ID to the real ID based on the contact request from the reachability user 1114, judges whether or not the conversion is to be executed with reference to the registered number of times "3".

If FIG. 29 is used as an example, the conversion from the reachability ID to the real ID by the reachability-ID management section 210 is up to three times, whereby the fourth conventional is not executed. More specifically, the reachability-ID-use application 1113, even if it tries to execute the fourth contact to the subscriber by using the above reachability ID attached with the time limit, cannot succeed the contact.

Embodiment 9

Next, a ninth embodiment of the present invention will be described with reference to the drawings. In the ninth embodiment, a number of execution times may be provided as the term of validity, upon validating the reachability ID in the sixth embodiment. The reachability-ID management section 210 stores therein the time instant at which the reachability ID becomes valid for each reachability ID, and unless the difference between the same and the time instant of a conversion from the reachability ID to the real ID exceeds the period set up beforehand, executes the conversion from the reachability ID to the real ID.

FIG. 30 is an explanatory chart showing an example of registration of the reachability-ID action table in the ninth embodiment. In the ninth embodiment, the action and period are set in association with the variable in the reachability-ID action table. Note that the unit of period is minute in the example shown in FIG. 30. In the example shown in FIG. 30, the conversion from the reachability ID to the real ID by the reachability-ID management section 210 is up to 60 minutes since the reachability ID is made valid, and thus not executed after the 60 minutes. More specifically, the reachability-ID-use application 1113, even if it tries to perform connection to the subscriber after the 60 minutes by using the above reachability ID attached with the time limit, cannot succeed.

Embodiment 10

Next, a tenth embodiment of the present invention will be described with reference to the drawing. In the tenth embodiment, a time instant may be provided as the term of validity, upon validating the reachability ID in the sixth embodiment. For example, the reachability-ID management section 210 performs a conversion from the reachability ID to the real ID if the time instant of the conversion from the reachability ID to the real ID does not exceed the time instant set up beforehand.

FIG. 31 is an explanatory chart showing an example of registration of the reachability-ID action table in the tenth embodiment. In the tenth embodiment, the action and time instant are set in association with the variable in the reachability-ID action table. In the example shown in FIG. 31, date is set as the time instant. In the example shown in FIG. 31, the conversion from the reachability ID to the real ID by the reachability-ID management section 210 is executed up to 23:59 on Jan. 1, 2010, and is not executed after that date. For example, the reachability-ID-use application 1113, even if it tries to perform a contact to the subscriber at 0:10 on Jan. 1, 3011 by using above reachability ID attached with the time limit, cannot succeed.

In addition, the reachability-ID management section 210 executes a conversion from the reachability ID to the real ID, if the time instant of the conversion from the reachability ID to the real ID exceeds the time instant set up beforehand, for example. In the example shown in FIG. 31, the conversion from the reachability ID to the real ID by the reachability-ID management section 210 is from 23:59 on Jan. 1, 2010, and a conversion before that date is not executed for example. For example, the reachability-ID-use application 1113, even if it tries to perform a contact to the subscriber at 0:10 on Jan. 1, 2007 by using the above reachability ID attached with the time limit, cannot succeed.

Embodiment 11

Next, an eleventh embodiment of the present invention will be described. In the eleventh embodiment, the number of times, period, and time instant may be provided as the term of validity upon validating the reachability ID in the sixth embodiment. FIG. 32 is an explanatory chart showing an example of registration of the reachability-ID action table in the eleventh embodiment. In the eleventh embodiment, the action, number of times, period, and time instant are set in accordance the variable in the reachability-ID action table.

In order that the reachability-ID management section 1103 judges whether or not the conversion from the reachability ID to the real ID is to be executed, the following calculation may be performed:

"number of times is within the time limit" X "period is within the time limit" X "time instant is within the time limit", where AND or OR is substituted for X. If the result of calculation is true, conversion is executed, whereas if the result of calculation is false, conversion is not performed.

Embodiment 12

Next, a twelfth embodiment of the present invention will be described. In the present embodiment, only when the service client needs, or only when the subscriber does not feel a trouble, the reachability to the service client is controlled valid for the service provider, and the service flow is acquired and verified for each service provider, in order to guarantee whether or not the reachability is to be provided while keeping the anonymity of the service client.

In the twelfth embodiment, the flow template in accordance with the flow-template verification policy is registered in the reachability-use-flow management server 1300. The flow-template verification policy is a policy for verifying whether or not the flow template has a flow that can provide a superior reachability. For example, the flow-template verification policy verifies that the contents that cause extraction of the real ID without a limit are not described in the flow template.

Figure 33:
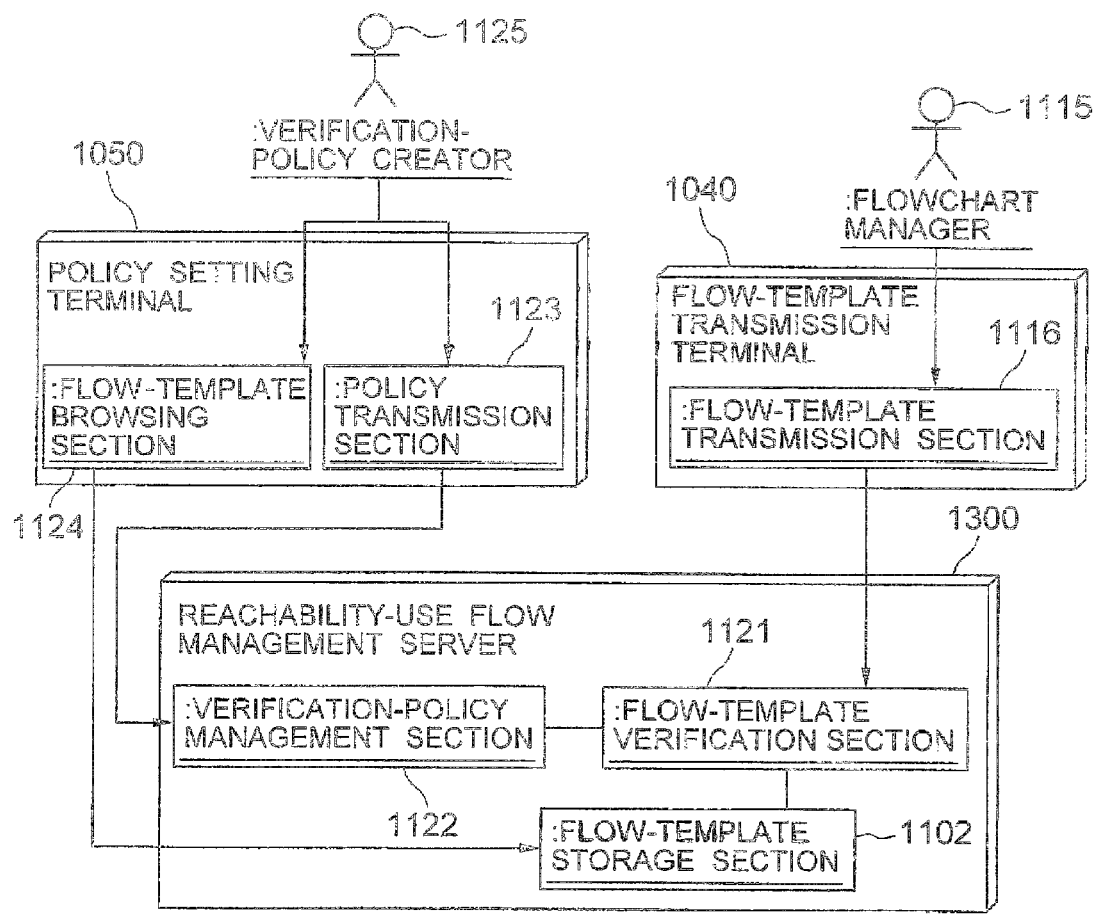
FIG. 33 is a block diagram exemplifying a reachability management system according to a twelfth embodiment.

FIG. 33 is a block diagram exemplifying the reachability management system of the twelfth embodiment. FIG. 33 shows an extended portion from FIG. 15. The flow-template verification section 1121 judges whether or not the flow template is to be registered in the flow-template storage section 1102, and registers the flow template transmitted to the flow-template storage section 1102, based on the flow template received from the flow-template transmission section 1116 and the flow-template verification policy corresponding thereto.

The verification-policy management section 1122 has the function of storing and managing the flow-template verification policy. A flowchart manager 1115 uses the flow-template transmission section 1116 in the flow template transmitting terminal 1040. The flow-template transmission section 1116 transmits the flow template to the flow-template verification section 1121. A verification-policy creator 1125 uses a policy transmission section 1123 and a flow-template browsing section 1124 in the policy setting terminal 1050.

The policy transmission section 1123 transmits the flow-template verification policy to the verification-policy management section 1122. The flow-template browsing section 1124 receives the flow template stored in the flow-template storage section 1102, for example, and allows the policy setting terminal 1050 to display the same.

FIG. 34 is an explanatory chart showing an example of registration of the flow template table in the twelfth embodiment. FIG. 34 shows a flow template registered by the flowchart manager 1115 in the reachability-use-flow management server 1300. Unlike the flow template shown in FIG. 3, the action (valid or invalid) and parameters (number of times, period, time instant) that control the reachability ID are described in the flow template shown in FIG. 34.

The verification-policy creator 1125 first transmits the flow-template verification policy to the verification-policy management section 1122 by using the policy transmission section 1123 in the policy setting terminal 1050. In this embodiment, it is assumed that the action, such as "IF at least one doReachability (reachabilityId, invalid) is included, THEN true", that control the reachability are described in the flow-template verification policy.

Next, the flowchart manager 1115 transmits the flow template to the flow-template verification section 1121 by using the flow-template transmission section 1116 in the flow template transmitting terminal 1040. In this case, the flow template shown in FIG. 34 will be described as an example. The flow-template verification section 1121 receives the flow-template verification policy from the verification-policy management section 1122, and evaluates the flow template transmitted from the flow-template transmission section 1116 in accordance with the received policy. Since at least one doReachability (reachabilityId, invalid) is included in the flow template exemplified in FIG. 34, the result is "true". Therefore, the flow-template verification section 1121 registers the flow template shown in FIG. 34 in the flow-template storage section 1102.

As described heretofore, according to the twelfth embodiment, the business-flow template used by the service providers 1114 controls the reachability to the service client 1104 to be valid for the service provider 1114 only when the service client 1104 needs the same or only when the subscriber does not feel a trouble, and the flow-template verification section 1121 collectively verifies on behalf of the subject of the reachability ID whether or not the reachability is to be provided while keeping the anonymity of the service client 1104, whereby the time and effort of the subject of the reachability ID for individually verifying the reachability control method of the service providers can be saved.

Embodiment 13

Next, a thirteenth embodiment of the present invention will be described. In the thirteenth embodiment, the action and parameters that control the reachability may be described in the verification policy of the flow template in the twelfth embodiment. For example, the flow-template verification policy may be set such that: "IF (at least one doReachability (reachabilityId, invalid) is included) AND (validity term of reachability ID is a single time and within 600 seconds, and until 15:00 on Jun. 26, 2007) THEN true".

In this case, evaluation to the flow template table shown in FIG. 34 is false, whereby the flow-template verification section 1121 does not register the flow template in the flow-template storage section 1102.

Embodiment 14

Next, a fourteenth embodiment of the present invention will be described. In the sixth embodiment, the reachability ID is delivered to each service-use request. In this case, the reachability-ID-use application 1113 does not know the relevance between the reachability IDs received. For example, it is not known that reachability ID1 and reachability ID2 are the same subscriber. In the fourteenth embodiment, the reachability ID is reused for each service ID, and the ID to be delivered for each service-use request is provided from other than the reachability ID, thereby providing the relevance between the reachability IDs.

With reference to the configuration diagram showing in FIG. 15, operation of the fourteenth embodiment of the present invention will be described. It is assumed that the reachability-ID management section 210 assigns the reachability ID for each combination of the real ID and service ID. For example, if a service-providing request is transmitted together with real ID "a@b.com" and service ID "restaurant1234", reachability ID "4d40a4adb5ada496d96610b0dd9f8042" is assigned thereto. Even if another service-providing request is transmitted together with the same real ID and service ID, reachability ID "4d40a4adb5ada496d96610b0dd9f8042" is assigned.

FIG. 35 is an explanatory chart showing an example of registration in the present-state management table in the fourteenth embodiment. In the fourteenth embodiment, information including request identification information (request ID) and the present state of flow is set in the present-state management table. FIG. 36 is an explanatory chart showing an example of registration of the flow template table in the fourteenth embodiment. Hereinafter, it is assumed that the business flow for restaurants shown in FIG. 36 is set in the reachability-use-flow management server 1300. The business flow shown in FIG. 36 realizes a seat reservation service of the restaurants.

The doReachability( ) function has a request ID in the first argument, and has a value for the variable item in the reachability-ID action table (refer to FIG. 18) in the second argument. In the reachability-ID-validity management table, execution of the doReachability( ) function executes the action corresponding to the variable specified as the second argument with respect to the validity flag associated with request ID specified as the first argument.

The notify( ) function has a reachability ID in the first argument, has a request ID in the second argument, has a contact address of the notification destination in the third argument, and has the message content in the fourth argument. Execution of the notify( ) function executes the action that notifies the reachability ID and request ID to the contact address of the third argument. It is assumed in the following description that the service ID of the restaurant seat reservation is "restaurant1234".

It is assumed that the subscriber made a service-use request to the service ID "restaurant1234". It is also assumed that the data exemplified in FIG. 37(a) is saved in the reachability-ID-validity management table stored in the reachability-ID management section 210.

FIG. 37 is an explanatory chart showing an example of registration of the reachability-ID-validity management table in the fourteenth embodiment. The information including the real ID, service ID, reachability ID, request ID, and validity flag is set in the reachability-ID-validity management table shown in FIG. 37. The value of "request ID" item of the reachability-ID-validity management table shown in FIG. 37 is unique, and assigned to each service-use request. More specifically, the reachability-ID management section 210, upon receiving the service-use request, registers the reachability ID corresponding to the received real ID and service ID and the request ID.

Next, operation of the fourteenth embodiment will be described with reference to the drawing. Hereinafter, with reference to FIG. 21, operation of the subscriber performing a seat reservation request to the restaurateur by using the seat reservation request will be described. The subscriber 1104 uses the service-use terminal 1010 (including a non-contact IC-card reader in this case), to read the service ID written in the non-contact IC card attached to the advertisement of the restaurant, for example, and perform operation of requesting the seat reservation service. Next, the service-use request section 1105 in the service-use terminal 1010 transmits a "service-use request" together with the own real ID and service ID "restaurant1234" to the reachability-ID application section 1107 (step S101).

The reachability-ID application section 1107, upon receiving the "service-use request", transmits the "reachability-ID acquisition request" together with the real ID of the subscribers 1104 and service ID to the reachability-ID management section 210. The reachability-ID management section 210 generates and saves the request ID corresponding to the reachability ID of the service client received (refer to FIG. 37(b)), and transmits the reachability ID and request ID to the reachability-ID application section 1107 (step S102). Here, it is assumed that the reachability ID is "4d40a4adb5ada496d96610b0dd9f8042", and the request ID is "2".

The reachability-ID application section 1107 transmits the "service-use request" together with the reachability ID, request ID, and service ID of the subscribers 1104 to the service-providing front end 1109. The service-providing front end 1109 transfers the "service-use request" to the event evaluation section 1110 corresponding to the service ID, if the "service-use request" is received (step S103).

The event evaluation section 1110 first extracts the reachability ID of the subscriber 1104 and request ID from the "service-use request", and adds the row of the request ID and default post-transition state in the present-state management table (refer to FIG. 35(a)). The event evaluation section 1110 determines the post-transition state and action based on the present-state management table (refer to FIG. 35(a)) in the flow-data storage section 1101 and the restaurant flow template (refer to FIG. 36) in the flow-template storage section 1102 (step S104). Here, since the present state is "during receiving reservation" and the condition is "service-use request", the "completion of reservation request" is selected as the post-transition state, and the "doReachability(reachabilityId, requestId, A); notify (reachabilityId, requestId, to, reachabilityId+");" is selected as the action.

The event evaluation section 1110 updates the present state in the present-state management table of request ID "2" to "the completion of reservation request" (refer to FIG. 35(b)). The event evaluation section 1110 outputs the action-execution request to the action execution section 1111 together with the information representing two actions determined in step S104, and reachability ID and request ID (step S105). In this case, the action-execution request includes the "doReachability (requestId, A)", "reservation request is received from "notify (reachabilityId, requestId, to, reachabilityId+");)", reachability ID "4d40a4adb5ada496d96610b0dd9f8042" and request ID "2".

The action execution section 1111 performs the "doReachability (requestId, A)". More specifically, the action execution section 1111 outputs the update request for the reachability-ID-validity management table together with request ID "2" to the reachability-ID management section 210. In this case, the updating means validating of "reachability ID "4d40a4adb5ada496d96610b0dd9f8042" corresponding to request ID "2" managed by the reachability-ID management section 210. The reachability-ID management section 210 updates the reachability-ID-validity management table (step S106). As the result of updating in this case, the reachability-ID-validity management table is that shown in FIG. 37(c).

Subsequently, the action execution section 1111 executes the action "reservation request is received from "notify (reachabilityId, requestId, to, reachabilityId+");". The action execution section 1111 extracts contact address "restaurant1234@example.com" of the reachability-ID-use application 1113 corresponding to service ID "restaurant1234" from the service-ID management section 1112, and notifies the event including reachability ID "4d40a4adb5ada496d96610b0dd9f8042" and request ID "2" in the extracted contact address (step S107). The reachability-ID-use application 1113 saves the reachability ID and request ID received.

Next, operation of the restaurateur in the case of contacting to the subscriber after preparation of the seat of subscriber in the restaurant will be described with reference to FIG. 22. In this case, the reachability user 1114 of restaurant-A uses the reachability-ID-use application 1113 in the service-use terminal 1010 (step S201), to transmit a request of the contact to the subscriber 1104 together with request ID "2" to the reachability-ID application section 1107.

The reachability-ID application section 1107 uses the reachability-ID management section 210 (step S202) to try conversion from the request ID to the real ID. Since the request ID "2" is valid in this case (refer to FIG. 37(c)), conversion to the real ID is valid. In addition, the request ID "2" corresponds to the real ID "tsuta@tsuta.com" (refer to FIG. 37(c)). The reachability-ID application section 1107 transmits a request of contact to the subscriber 1104 together with the real ID "tsuta@tsuta.com" to the information distribution section 1108.

The information distribution section 1108 communicates to the contact receiving section 1106 in the contact receiving terminal 1030 (step S203). The subscriber 1104 receives notification of completion of reservation request including request ID "2" as the number for the identity verification from the restaurant-A via the information distribution section 1108. The notification may be by e-mail, for example.

Next, operation in a case where the subscriber 1104 receiving the notification of completion of the seat reservation appears in the restaurant will be described. The case where the event that the subscriber appears in the restaurant will be described as an example with reference to FIG. 23.

The reachability user 1114 of restaurant-A checks the request ID presented by the subscriber 1104, in order to assure that the subscriber appearing in the store is the very subscriber 1104 that reserved. As the method for checking, it may be considered to visually compare the mail including therein request ID "2" and presented by the subscriber 1104 against the request ID saved in the reachability-ID-use application 1113 for matching therebetween. The reachability user 1114 of restaurant-A transmits the event "requestId appears" together with the request ID to the event evaluation section 1110 by using the reachability-ID-use application 1113 (step S301).

The event evaluation section 1110 determines the post-transition state and action based on the present-state management table (refer to FIG. 35(b)) in the flow-data storage section 1101 and the restaurant flow template (refer to FIG. 36) in the flow-template storage section 1102 (step S302). Here, since the present state is "completion of reservation request", upon receiving the event "requestId appears", the "completion of appearance" is selected as the post-transition state, and the "doReachability (requestId, B)" is selected as the action.

The event evaluation section 1110 updates the present state in the present-state management table to the "completion of appearance" (refer to FIG. 35(c)). Since the action "invalid" is registered to variable B in the reachability-ID action table in this case (refer to FIG. 18), selection of the doReachability( ) causes execution of the action that invalidates request ID "2". The event evaluation section 1110 outputs an action-execution request to the action execution section 1111 (step S303). In this case, the action-execution request includes the "doReachability (requestId, B)" and request ID "2".

The action execution section 1111 executes the "doReachability (requestId, B)". More specifically, the action execution section 1111 transmits an update and setting request for the reachability-ID-validity management table together with the request ID to the reachability-ID management section 210. In this case, the updating/setting means invalidating reachability ID "4d40a4adb5ada496d96610b0dd9f8042" corresponding to request ID "2". The reachability-ID management section 210 updates the reachability-ID-validity management table (step S304). As the result of updating in this case, the reachability-ID-validity management table is that shown in FIG. 37 (d).

Even if a contact to the subscriber 1104 is tried through the reachability-ID-use application 1113 by using request ID "2" at this stage, the reachability-ID management section 210 does not apply the conversion from the reachability ID to the real ID, because the reachability ID corresponding to request ID "2" is invalid. More specifically, the contact to the subscriber from the reachability-ID-use application 1113 is not successful.

Next, operation in a case where the subscriber leaves an article behind in the restaurant and the restaurant side contacts the subscriber with respect to the left article will be described. The case where the event that the subscriber leaves the article occurs will be described as an example with reference to FIG. 23. The reachability user 1114 of restaurant-A finds the article of subscriber 1104 left behind. Whether the article left behind belongs to the subscriber 1104 is deduced from the seat number on which the article left behind is located, for example. The reachability user 1114 transmits the event "request ID "2" leaves article behind" to the event evaluation section 1110 by using the reachability-ID-use application 1113 (step S301).

The event evaluation section 1110 determines the post-transition state and action based on the present-state management table (refer to FIG. 35(c)) in the flow-data storage section 1101 and the restaurant flow template (refer to FIG. 36) in the flow-template storage section 1102 (step S302). Here, since the present state is "completion of appearance", the reception of event "reachabilityId leaves article behind" causes the "end" to be selected as the post-transition state and the "doReachability (reachabilityId, A)" to be selected as the action.

The event evaluation section 1110 updates the present state in the present-state management table to the "end" (refer to FIG. 35 (*d*)). In this case, since action "valid" is registered to variable A in the reachability-ID action table (refer to FIG. 18), selection of the doReachability( ) causes execution of the action that validates reachability ID "4d40a4adb5ada496d96610b0dd9f8042" corresponding to request ID "2". The event evaluation section 1110 outputs an action-execution request to the action execution section 1111 (step S303). In this case, the action-execution request includes the "doReachability (requestId, A)" and request ID "2".

The action execution section 1111 executes the "doReachability (requestId, A)". More specifically, the action execution section 1111 transmits an update request for the reachability-ID-validity management table together with the request ID to the reachability-ID management section 210. In this case, the updating means validating of request ID "2". The reachability-ID management section 210 updates the reachability-ID-validity management table (step S304). As the result of updating in this case, the reachability-ID-validity management table is that shown in FIG. 37(*c*).

Subsequently, operation of the reachability management system in the case where the reachability user contacts to the subscriber will be described with reference to FIG. 22. Hereinafter, the case where the reachability user contact to the subscriber with respect to the article left behind will be described as an example. The reachability user 1114 of restaurant-A uses the reachability-ID-use application 1113 in the service-use terminal 1010, to transmit a request of contact to the subscriber 1104 together with request ID "2" to the reachability-ID application section 1107 (step S201).

The reachability-ID application section 1107 uses the reachability-ID management section 210 to try conversion from the reachability ID to the real ID (step S202). In this case, since request ID "2" is valid (refer to FIG. 37(*c*)), the conversion to the real ID is valid. The reachability-ID application section 1107 transmits a request of contact to the subscriber 1104 together with the real ID to the information distribution section 1108.

The information distribution section 1108 communicates to the contact receiving section 1106 in the contact receiving terminal 1030 (step S203). The subscriber 1104 receives the notification as to the article left behind via the information distribution section 1108. The contact may be by e-mail, for example.

Embodiment 15

Next, a fifteenth embodiment of the present invention will be described. The event transmitted to the event evaluation section 1110 may be transmitted from the internal of the reachability-use-flow management server 1300. The event transmitted to the event evaluation section 1110 may include the information resource of the carrier.

Embodiment 16

Figure 38:
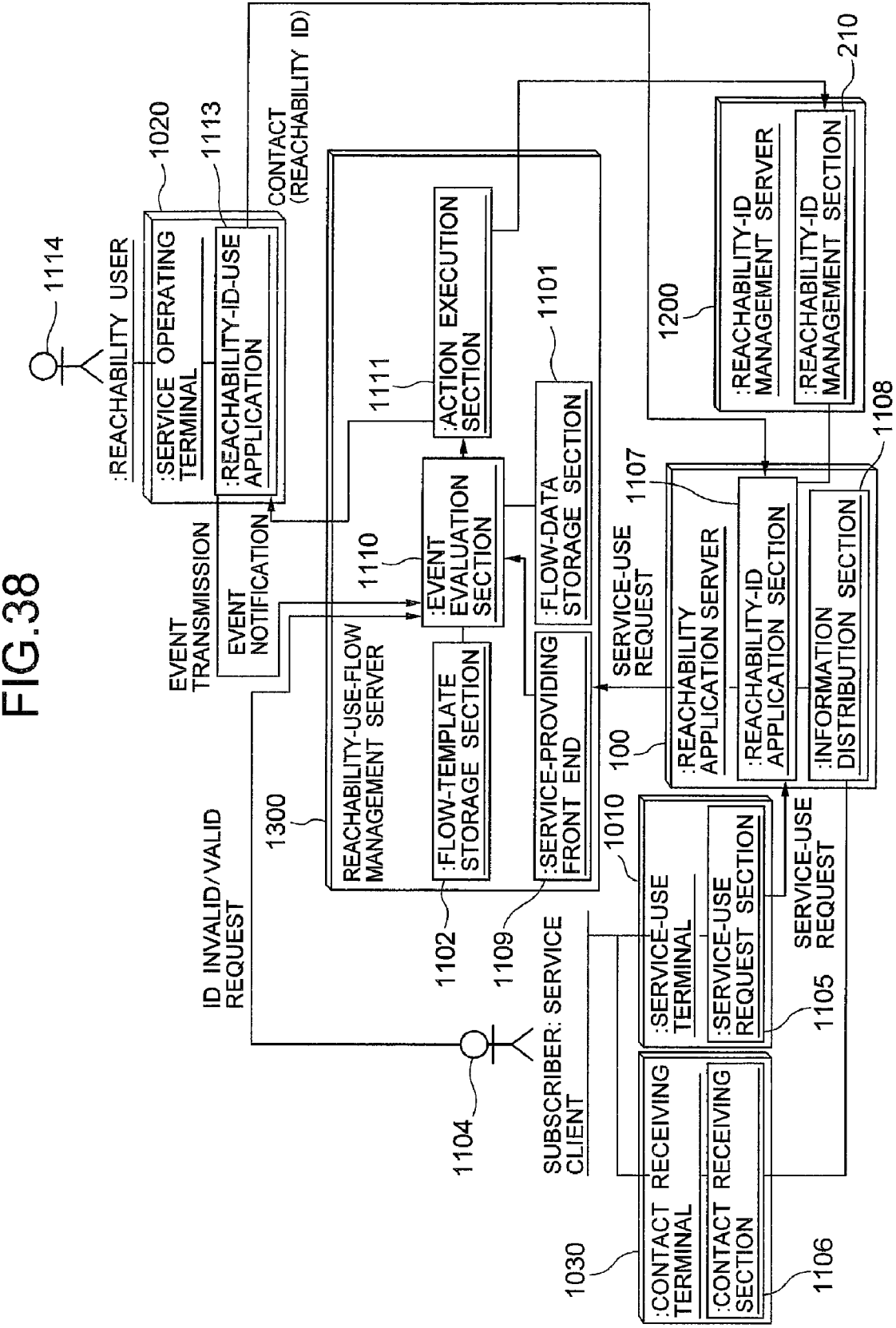
FIG. 38 is a block diagram exemplifying a reachability management system according to a sixteenth embodiment.

Next, a sixteenth embodiment of the present invention will be described. FIG. 38 is a block diagram exemplifying the reachability management system of the sixteenth embodiment. Note that constituent elements similar to those in the sixth embodiment are denoted by similar reference numerals, and are omitted for description. In the present embodiment, as shown in FIG. 38, the subscriber 1104 may transmit an event to the event evaluation section 1110 by using the service-use request section 1105. For example, the event may include a validation request (or invalidation request) for the reachability ID and the reachability ID of the subscriber.

According to the sixteenth embodiment, if the subscriber 1104 does not need the contact to the subscriber 1104 from the reachability-ID-use application 1113, the subscriber 1104 can spontaneously cancel the reachability ID. It is possible for the subscriber 1104 to spontaneously validate the reachability ID corresponding to the subscriber 1104 that is invalidated by the business flow, whereby it is possible to communicate from the reachability-ID-use application 1113 to the subscriber 1104.

Note that in each of the above embodiments, the contact receiving section 1106 and the service-use request section 1105 may be united to a signal terminal.

As described above, according to the present invention, neither the service provider nor the reachability user can use the real ID, thereby achieving the advantage that an unjustified use of the real ID does not occur. There is also the advantage that the reachability user can use the reachability ID instead of the real ID to contact to the reachability presenter.

As described above, the present invention is realized in the above-described exemplary embodiment as follows. The reachability realization server is realized by the reachability-ID management server 200 and reachability application server 100. The second user terminal is realized by the reachability terminal 10. The real-address-information receiving section is realized by the reachability-ID application section 110. The post-conversion-address-information generation section is realized by the reachability-ID management section 210. The reachability-ID management section 210 includes the post-conversion-address-information generation section, request-identity-information generation section, address-information update section, and real-address-information extraction section. The access-request transfer section is realized by the information distribution section 120, service-providing server is realized by the reachability-ID storage section 220 and reachability-ID validity-condition storage section 250, the update-process-information storage section is realized by the flow-template storage section 1102, the update-process-information extraction section is realized by the event evaluation section 1110, the real-address-information receiving section is realized by the reachability-ID application section 110, the real-address-information extraction section is realized by the reachability-ID management section 210, and the first user terminal is realized by the reachability terminal 20. The post-conversion-address-information generation section is realized by the reachability-ID management section 210, the post-conversion-address-information transmission section is realized by the reachability-ID application section 110, and the history storage section is realized by the reachability-ID-use-history management section 230.

In the above-described embodiments, the reachability realization server having the following modes are exemplified.

(1) The reachability realization server (for example, reachability application server 100 and reachability-ID management server 200) that realizes reachability from a first user (for example, reachability user) to a second user (for example, service client) that have therebetween no acquaintance, including: a real-address-information receiving section (for example, reachability-ID application section 110) that receives real-address information, which is capable of contacting therethrough to the second user, from a second terminal (for example, reachability terminal 10) used by the second user; and a post-conversion-address-information generation section (for example, reachability-ID management section 210) that generates postconversion-address information, which the first user cannot specify, based on the real-address information received by the real-address-information receiving section.

(2) The reachability realization server including: an address-information storage section (for example, reachability-ID storage section 220) that stores, in association with the real-address information, the post-conversion-address information generated by the post-conversion-address-information generating section; a real-address-information extraction section (for example, reachability-ID management section 210) that extracts, upon receiving an access request including the post-address information from a first user terminal (for example, reachability terminal 20) used by the first user, the real-address information corresponding to the post-conversion-address information included in the received access request from the address-information storage section; and an access-request transfer section (for example, information distribution section 120) that transfers to the second user terminal the access request from the first user terminal based on the real-address information extracted by the real-address-information extraction section.

(3) The reachability realization server including a post-conversion-address-information transmission section (for example, reachability-ID application section 110) that transmits the post-conversion-address information generated by the post-conversion-address-information generation section to the service-providing server (for example, service-providing server 300) that provides a service based a request from the second user.

(4) The reachability realization server, including a service-provider storage section (for example, service-provider solution section 130) that stores therein in advance information, which is capable of identifying a service-providing server, in association with information that is capable of identifying a service, wherein: the real-address-information receiving section receives the information, which is capable of identifying the service, together with the real-address information; the post-conversion-address-information transmission section extracts the information, which is capable of identifying the service-providing server, from the service-provider storage section based on the received information which is capable of identifying the service, and transmits the post-conversion-address information to the service-providing server that is represented by the extracted information. According to such a configuration, even if a plurality of service-providing server are provided, the post-conversion-address information can be appropriately transmitted.

(5) The reachability realization server, wherein the address-information storage section stores the post-conversion-address information that is capable of being updated at an arbitrary timing. According to such a configuration, the post-conversion-address information can be updated at an arbitrary timing.

(6) The reachability realization server, wherein the address-information storage section stores information representing a term of validity of the post-conversion-address information in association with the post-conversion-address information. According to such configuration, the post-conversion-address information can be updated based on the term of validity of the post-conversion-address information.

(7) The reachability realization server, wherein: the address-information storage section stores an enablement condition of the post-conversion-address information in association with the post-conversion-address information; and the real-address-information extraction section, upon receiving an access request, extracts the real-address information based on the condition. According to such a configuration, suitable use of the reachability can be realized.

(8) The reachability realization server, including a history storage section that stores therein history of generation of the post-conversion-address information and extraction of the real-address information, wherein: the real-address-information extraction section, upon receiving an access request, extracts the real-address information based on the history stored in the history storage section and the condition stored in the address-information storage section. According to such configuration, more suitable use of the reachability can be achieved.

(9) The reachability realization server, wherein the address-information storage section stores therein an update enablement condition in association with the post-conversion-address information. According to such configuration, a more suitable use of the reachability can be achieved.

(10) The reachability realization server, wherein the address-information storage section stores therein a range of number of times for using the post-conversion-address information in association with the post-conversion-address information as an enablement condition for the post-conversion-address information. According to such configuration, the limited number of use of the post-conversion-address information can be set as the condition.

(11) The reachability realization server, including: an update-process-information storage section (for example, realized by the action of flow-template storage section 1102) that stores, in association with a specific state in a business flow, update-process information (for example, realized by the action of flow template table) representing a processing of updating the information stored in the address-information storage section; an update-process-information extraction section that extracts, upon receiving event information including information representing the post-conversion-address information and a present state from the first user terminal, the update-process information from the update-process-information storage section based on the information representing the present state included in the received event information; an address-information update section that updates the information stored in the address-information storage section based on the update-process information extracted by the update-process-information extraction section and the post-conversion-address information included in the received event information. The reachability realization server configured as such can update the information stored in the address-information storage section in accordance with the state in the business flow.

(12) The reachability realization server, wherein: the address-information storage section stores, in association with the post-conversion-address information, an extraction acceptance/rejection flag (for example, realized by the validity flag) representing whether or not the real-address information corresponding to the post-conversion-address information is capable of being extracted; the update-process-information storage section stores therein update-process information representing processing of updating the extraction acceptance/rejection flag stored in the address-information storage section; and the real-address-information extraction section extracts the real-address information corresponding to the post-conversion-address information based on the extraction acceptance/rejection flag stored in the address-information storage section. The reachability realization server configured as such can extract the real-address information corresponding to the post-conversion-address information in accordance with the state in the business flow.

(13) The reachability realization server, wherein the update-process-information storage section stores, in association with the real-address information corresponding to the post-conversion-address information included in the event information received by the update-process-information extraction section, the update-process information representing processing of updating the post-conversion-address information stored in the address-information storage section, and thereafter generates or deletes the post-conversion-address information stored in the address-information storage section.

(14) The reachability realization server, wherein the update-process-information storage section stores therein information representing the number of times of allowing extraction of the real-address information corresponding to the post-conversion-address information.

(15) The reachability realization server, wherein the update-process-information storage section stores therein the update-process information including information representing the period for allowing extraction of the real-address information corresponding to the post-conversion-address information.

(16) The reachability realization server wherein the update-process-information storage section stores therein the update-process information including information representing the time instant for allowing extraction of the real-address information corresponding to the post-conversion-address information.

(17) The reachability realization server, wherein the update-process-information storage section stores therein the update-process information including an arbitrary combination information representing a number of times, a period, and a time instant for allowing extraction of the real-address information corresponding to the post-conversion-address information.

(18) The reachability realization server including a verification section (for example, realizes by flow-template verification section 1121) that verifies whether or not the update-process information (for example, realized by flow-template verification policy) stored in the update-process-information storage section includes a content of controlling the reachability.

(19) The reachability realization server, wherein the verification section verifies whether or not the update-process information representing the processing that updates the extraction acceptance/rejection flag satisfies a specific condition.

(20) The reachability realization server, wherein the verification section verifies whether or not the update-process information satisfies a specific condition including the condition that allows extraction of the real-address information corresponding to the post-conversion-address information.

(21) The reachability realization server, wherein the verification section verifies whether or not the update-process information satisfies a specific condition including the information representing the number of times for allowing extraction of the real-address information corresponding to the post-conversion-address information.

(22) The reachability realization server, wherein the verification section verifies whether or not the update-process information satisfies a specific condition including the information representing the period for allowing extraction of the real-address information corresponding to the post-conversion-address information.

(23) The reachability realization server, wherein the verification section verifies whether or not the update-process information satisfies a specific condition including the information representing the time instant for allowing extraction of the real-address information corresponding to the post-conversion-address information.

(24) The reachability realization server, wherein the verification section verifies whether or not the update-process information satisfies a specific condition including the arbitrary combination information representing a number of times, a period, and a time instant for allowing extraction of the real-address information corresponding to the post-conversion-address information.

(25) The reachability realization server, wherein the verification section verifies whether or not the update-process information satisfies a condition that satisfies all or any of specific conditions representing the number of times, period or time instant for allowing extraction of the real-address information corresponding to the post-conversion-address information.

(26) The reachability realization server including a request-ID generation section (for example, realized by reachability-ID management section 210) that generates a request ID each time the real-address-information receiving section receives the real-address information, wherein: the address-information storage section stores, in association with the post-conversion-address information, the request ID generated by the request-ID generation section; the update-process-information extraction section, upon receiving the event information including information representing a request ID and a present state from the first user terminal, extracts the update-process information from the update-process-information storage section based on the information representing the present state included in the received event information; and the address-information update section updates the information stored in the address-information storage section based on the update-process information extracted by the update-process-information extraction section and the request ID included in the received event information.

(27) The reachability realization server, wherein: the update-process-information extraction section receives the post-conversion-address information and the update-process information from the second user terminal; and the address-information update section updates the information stored in the address-information storage section based on the post-conversion-address information and the update-process information received by the update-process-information extraction section.

This application is based upon and claims the benefit of priority from Japanese patent applications No. 2007-057597 filed on Mar. 7, 2007 and No. 2007-239321 filed on Sep. 14, 2007, the disclosure of which is incorporated herein in its entirety by reference.

INDUSTRIAL APPLICABILITY

The present invention is applicable in order to prevent unjustified use of the contact address of the service client, and to assist spread of the service that handles the contact address of the service client. The present invention is also applicable to in the case where the service provider utilizes the information resources of the service client managed by the communication enterprise (carrier) to thereby provides a service. The present invention is further applicable to provision of a short term service to the service client managed by the communication enterprise (carrier).

The invention claimed is:

1. A reachability realization server that realizes reachability from a service-providing server held by a service-providing first user to a second user, comprising:
   a real-address-information receiving section that receives real-address information, which is capable of contacting there through to the second user, from a second terminal used by the second user;
   a service-provider storage section that stores therein server-identification information, which is capable of identifying at least one service-providing server, in association with service-identification information that is capable of identifying a plurality of services;
   a post-conversion-address-information generation section that generates post-conversion-address information, which the first user cannot specify, and which corresponds to said real-address information received by said real-address-information receiving section and said service-identification information;
   an access-request transfer section that transfers to said second user terminal an access request to said first user terminal based on said real address information extracted by said real-address-information extraction section;
   an address-information storage section that stores, in association with a specific state in a business flow, said post-conversion-address information generated by said post-conversion-address information in association with said real-address information of the second user;
   a real-address-information extraction section that extracts, upon receiving an access request including said post-address information from a first user terminal used by the first user, said real-address information corresponding to said post-conversion-address information included in said received access request from said address-information storage section;
   an access-request transfer section that transfers to said second user terminal said access request from said first user terminal based on said real-address information extracted by said real-address-information extraction section an update-process-information storage section that stores, in association with a specific state in a business flow, update-process information representing a processing of updating the information stored in said address-information storage section;
   an update-process-information extraction section that extracts, upon receiving event information including information representing said post-conversion-address information and a present state from said first user terminal, said update-process information from said update-process-information storage section based on the information representing said present state included in said received event information;
   an address-information update section that updates the information stored in said address-information storage section based on said update-process information extracted by said update-process-information extraction section and said post-conversion-address information included in said received event information;
   an access acceptance/rejection judgment section that judges, based on the information stored in said real-address-information storage section, access acceptance or rejection with respect to said access request from said first user terminal to said second user terminal; and
   a retrieval section that retrieves said real-address information of the second user based on said post-conversion address information received from said service-providing server.

2. The reachability realization server according to claim 1 further comprising a post-conversion-address-information transmission section that transmits said post-conversion-address information generated by said post-conversion-address-information generation section to said service-providing server that provides a service based a request from the second user.

3. The reachability realization server according to claim 2, wherein:
   said real-address-information receiving section receives said service-identification information together with said real-address information;
   said post-conversion-address-information transmission section extracts said server-identification information, from said service-provider storage section based on said received service-identification information and transmits said post-conversion-address information to said service-providing server that is represented by said extracted information.

4. The reachability realization server according to claim 1, wherein said address-information storage section stores said post-conversion-address information that is capable of being updated at an arbitrary timing.

5. The reachability realization server according to claim 1, wherein said address-information storage section stores information representing a term of validity of said post-conversion-address information in association with said post-conversion-address information.

6. The reachability realization server according to claim 1, wherein:
   said address-information storage section stores an enablement condition of said post-conversion-address information in association with said post-conversion-address information; and
   said real-address-information extraction section, upon receiving an access request, extracts said real-address information based on said condition.

7. The reachability realization server according to claim 6, further comprising a history storage section that stores therein history of generation of said post-conversion-address information and extraction of said real-address information, wherein:
   said real-address-information extraction section, upon receiving an access request, extracts said real-address information based on said history stored in said history storage section and said condition stored in said address-information storage section.

8. The reachability realization server according to claim 6, wherein said address-information storage section stores therein an update enablement condition in association with said post-conversion-address information.

9. The reachability realization server according to claim 6, wherein said address-information storage section stores therein a range of number of times for using said post-conversion-address information in association with said post-conversion-address information as an enablement condition for said post-conversion-address information.

10. A reachability realization server that realizes reachability from a first user to a second user, comprising:
    a real-address-information receiving section that receives real-address information, which is capable of contacting there through to the second user, from a second terminal used by the second user;

a post-conversion-address-information generation section that generates post-conversion-address information, which the first user cannot specify and which corresponds to said real-address information received by said real-address-information receiving section;

an access-request transfer section that transfers to said second user terminal an access request to said first user terminal based on said real address information extracted by said real-address-information extraction section;

an address-information storage section that stores, in association with a specific state in a business flow, said post-conversion-address information generated by said post-conversion-address information in association with said real-address information of the second user;

a real-address-information extraction section that extracts, upon receiving an access request including said post-address information from a first user terminal used by the first user, said real-address information corresponding to said post-conversion-address information included in said received access request from said address-information storage section;

an access-request transfer section that transfers to said second user terminal said access request from said first user terminal based on said real-address information extracted by said real-address-information extraction section an update-process-information storage section that stores, in association with a specific state in a business flow, update-process information representing a processing of updating the information stored in said address-information storage section;

an update-process-information extraction section that extracts, upon receiving event information including information representing said post-conversion-address information and a present state from said first user terminal, said update-process information from said update-process-information storage section based on the information representing said present state included in said received event information;

an address-information update section that updates the information stored in said address-information storage section based on said update-process information extracted by said update-process-information extraction section and said post-conversion-address information included in said received event information; and an access acceptance/rejection judgment section that judges, based on the information stored in said real-address-information storage section, access acceptance or rejection with respect to said access request from said first user terminal to said second user terminal.

11. The reachability realization server according to claim 10, wherein:

said address-information storage section stores, in association with said post-conversion-address information, an extraction acceptance/rejection flag representing whether or not said real-address information corresponding to said post-conversion-address information is capable of being extracted;

said update-process-information storage section stores therein update-process information representing processing of updating said extraction acceptance/rejection flag stored in said address-information storage section; and said real-address-information extraction section extracts said real-address information corresponding to said post-conversion-address information based on said extraction acceptance/rejection flag stored in said address-information storage section.

12. The reachability realization server according to claim 10, wherein said update-process-information storage section stores, in association with said real-address information corresponding to said post-conversion-address information included in said event information received by said update-process-information extraction section, said update-process information representing processing of updating said post-conversion-address information stored in said address-information storage section, and thereafter updates said post-conversion-address information stored in said address-information storage section.

13. The reachability realization server according to claim 10, wherein said update-process-information storage section stores, said update-process information representing a number of times for allowing retrieval of said real-address information corresponding to said post-conversion-address information.

14. The reachability realization server according to claim 10, wherein said update-process-information storage section stores therein said update-process information including information representing a number of times for allowing extraction of said real-address information corresponding to said post-conversion-address information.

15. The reachability realization server according to claim 10, wherein said update-process-information storage section stores therein said update-process information including information representing a period for allowing extraction of said real-address information corresponding to said post-conversion-address information.

16. The reachability realization server according to claim 10, wherein said update-process-information storage section stores therein said update-process information including information representing a time instant for allowing extraction of said real-address information corresponding to said post-conversion-address information.

17. The reachability realization server according to claim 10, wherein said update-process-information storage section stores therein said update-process information including an arbitrary combination information representing a number of times, a period, and a time instant for allowing extraction of said real-address information corresponding to said post-conversion-address information.

18. The reachability realization server according to claim 10, comprising a verification section that verifies whether or not said update-process information stored in said update-process-information storage section includes a content of controlling the reachability.

19. The reachability realization server according to claim 18, wherein said verification section verifies whether or not said update-process information representing processing of updating said extraction acceptance/rejection flag stored in said address-information storage section satisfies a specific condition.

20. The reachability realization server according to claim 18, wherein said verification section verifies whether or not said update-process information satisfies said specific condition including a condition of allowing extraction of said real-address information corresponding to said post-conversion-address information.

21. The reachability realization server according to claim 18, wherein said verification section verifies whether or not said update-process information satisfies said specific condition including information representing a number of times for allowing extraction of said real-address information corresponding to said post-conversion-address information.

22. The reachability realization server according claim 18, wherein said verification section verifies whether or not said update-process information satisfies said specific condition including information representing a period for allowing extraction of said real-address information corresponding to said post-conversion-address information.

23. The reachability realization server according to claim 18, wherein said verification section verifies whether or not said update-process information satisfies said specific condition including information representing a time instant for allowing extraction of said real-address information corresponding to said post-conversion-address information.

24. The reachability realization server according to claim 18, wherein said verification section verifies whether or not said update-process information satisfies said specific condition including arbitrary combination information representing the number of times, period, and time instant for allowing extraction of said extract real-address information corresponding to said post-conversion-address information.

25. The reachability realization server according claim 18, wherein said verification section verifies whether or not said update-process information satisfies said specific condition that satisfies all or any of conditions including information representing a number of times, a period and a time instant for allowing extraction of said extract real-address information corresponding to said post-conversion-address information.

26. The reachability realization server according to claim 10, comprising a request-ID generation section that generates a request ID each time said real-address-information receiving section receives said real-address information, wherein:
    said address-information storage section stores, in association with said post-conversion-address information, said request ID generated by said request-ID generation section;
    said update-process-information extraction section, upon receiving said event information including information representing a request ID and a present state from said first user terminal, extracts said update-process information from said update-process-information storage section based on the information representing the present state included in said received event information; and
    said address-information update section updates the information stored in said address-information storage section based on said update-process information extracted by said update-process-information extraction section and said request ID included in said received event information.

27. The reachability realization server according to claim 10, wherein:
    said update-process-information extraction section receives said post-conversion-address information and said update-process information from said second user terminal; and
    said address-information update section updates the information stored in said address-information storage section based on said post-conversion-address information and said update-process information received by said update-process-information extraction section.

28. A reachability management system that manages reachability from a serviced-providing first user to a second user, comprising:
    a first user terminal used by the first user;
    a second user terminal used by the second user; and
    a reachability realization server that realizes reachability from the first user to the second user, said reachability realization server comprising:
        a real-address-information receiving section that receives from said second user terminal real-address information that is capable of contacting therethrough to the second user; and
        a post-conversion-address-information generation section that generates, based on said real-address information received by said real-address-information receiving section, post-conversion-address information through which the first user cannot specify said real-address information,
        a service-provider storage section that stores in advance information that is capable of identifying at least one service-provider server in association with service-identification information that is capable of identifying a plurality of services;
        a post-conversion-address-information generation section that generates post-conversion-address information which the first user cannot specify and which corresponds to said real-address information received by said real-address-information;
        an access-request transfer section that transfers to said second user terminal an access request to said first user terminal based on said real address information extracted by said real-address-information extraction section;
        an address-information storage section that stores, in association with a specific state in a business flow, said post-conversion-address information generated by said post-conversion-address information in association with said real-address information of the second user;
        a real-address-information extraction section that extracts, upon receiving an access request including said post-address information from a first user terminal used by the first user, said real-address information corresponding to said post-conversion-address information included in said received access request from said address-information storage section;
        an access-request transfer section that transfers to said second user terminal said access request from said first user terminal based on said real-address information extracted by said real-address-information extraction section an update-process-information storage section that stores, in association with a specific state in a business flow, update-process information representing a processing of updating the information stored in said address-information storage section;
        an update-process-information extraction section that extracts, upon receiving event information including information representing said post-conversion-address information and a present state from said first user terminal, said update-process information from said update-process-information storage section based on the information representing said present state included in said received event information;
        an address-information update section that updates the information stored in said address-information storage section based on said update-process information extracted by said update-process-information extraction section and said post-conversion-address information included in said received event information; an access acceptance/rejection judgment section that judges, based on the information stored in said real-address-information storage section, access acceptance or rejection with respect to said access request from said first user terminal to said second user terminal; and a retrieval section that retrieves said real-address information of the second user based on said post-conversion-address information received from said service-providing server.

29. The reachability management system according to claim 28 wherein:
said reachability realization server comprises a post-conversion-address-information transmission section that transmits to said service-providing server said post-conversion-address information generated by said post-conversion-address-information generation section; and
said service-providing server transmits said received post-conversion-address information to said first user terminal.

30. A reachability management system that manages reachability from a first user to a second user that have there between no acquaintance, comprising:
a first user terminal used by the first user;
a second user terminal used by the second user; and
a reachability realization server that realizes reachability from the first user to the second user,
said reachability realization server comprising:
a real-address-information receiving section that receives from said second user terminal real-address information that is capable of contacting therethrough to the second user;
a post-conversion-address-information generation section that generates, based on said real-address information received by said real-address-information receiving section, post-conversion-address information through which the first user cannot specify said real-address information;
an address-information storage section that stores, in association with said real-address information, said post-conversion-address information generated by said post-conversion-address-information generating section;
a real-address-information extraction section that extracts, upon receiving an access request including said post-address information from a first user terminal used by the first user, said real-address information corresponding to said post-conversion-address information included in said received access request from said address-information storage section; and
an access-request transfer section that transfers to said second user terminal said access request from said first user terminal based on said real-address information extracted by said real-address-information extraction section;
an update-process-information storage section that stores, in association with a specific state in a business flow, update-process information representing processing of updating the information stored in said address-information storage section;
an update-process-information extraction section that extracts, upon receiving event information including information representing said post-conversion-address information and a present state from said first user terminal, said update-process information from said update-process-information storage section based on information representing the present state included in said received event information;
an address-information update section that updates the information stored in said address-information storage section based on said update-process information extracted by said update-process-information extraction section and said post-conversion-address information included in said received event information; and
an access acceptance/rejection judgment section that judges, based on the information stored in said real-address-information storage section, access acceptance or rejection with respect to said access request from said first user terminal to said second user terminal.

31. A reachability management method by which a reachability realization server manages reachability from a service-providing server held by a service providing first user to a second user wherein:
the reachability realization server receives, from a second user terminal used by the second user, real-address information that is capable of contacting there through to the second user;
the reachability realization server stores in a service-provider storage section server-identification information, which is capable of identifying at least one service-providing server, in association with service-identification information that is capable of identifying a plurality of services;
the reachability realization server generates post-conversion-address information which corresponds said real address information and said service-identification information and through which the first user cannot specify said real-address information;
the reachability realization server stores said post-conversion-address in an address-information storage section in association with the second server;
the reachability realization server, upon receiving an access request including said post-address information from a first user terminal used by the first user, extracts said real-address information corresponding to said post-conversion-address information included in said received access request from said address-information storage section;
the reachability realization server updates the information stored in said address-information storage section based on said extracted update-process information and said post-conversion-address information included in said received event information;
the reachability realization server judges, based on the information stored in said real-address-information storage section, access acceptance or rejection with respect to said access request from the first use to the second user; and
said reachability realization server retrieves said real-address information of the second user based on the post-conversion-address information received from said service-providing server.

32. A reachability management method by which a reachability realization server manages reachability from a first user to a second user that have therebetween no acquaintance, wherein:
the reachability realization server receives, from a second user terminal used by the second user, real-address information that is capable of contacting therethrough to the second user;
the reachability realization server generates, based on said received real-address information, post-conversion-address information through which the first user cannot specify said real-address information;
the reachability realization server stores said post-conversion-address in an address-information storage section in association with the second server;
the reachability realization server, upon receiving an access request including said post-address information from a first user terminal used by the first user, extracts said real-address information corresponding to said post-conversion-address information included in said received access request from said address-information storage section;

the reachability realization server updates the information stored in said address-information storage section based on said extracted update-process information and said post-conversion-address information included in said received event information; and the reachability realization server judges, based on the information stored in said real-address-information storage section, access acceptance or rejection with respect to said access request from the first use to the second user.

33. A non-transitory computer-readable medium embodying a reachability realization program that realizes reachability from a service-providing server held by a service-providing first user to a second user, said program causing a computer to execute:

real-address-information receiving process that receives, from a second user terminal used by the second user, real-address information that is capable of contacting therethrough to the second user;

storing process that stores in a service-provider storage section server-identification information, which is capable of identifying at least one service-providing server, in association with service-identification information that is capable of identifying a plurality of services;

post-conversion-address-information generation process that generates post-conversion-address information which corresponds to said real address information and said service-identification information and through which the first user cannot specify said real-address information;

an access-request transfer process that transfers to said second user terminal an access request to said first user terminal based on said real address information extracted by said real-address-information extraction section;

an address-information storage process that stores, in association with a specific state in a business flow, said post-conversion-address information generated by said post-conversion-address information in association with said real-address information of the second user;

a real-address-information extraction process that extracts, upon receiving an access request including said post-address information from a first user terminal used by the first user, said real-address information corresponding to said post-conversion-address information included in said received access request from said address-information storage section;

an access-request transfer process that transfers to said second user terminal said access request from said first user terminal based on said real-address information extracted by said real-address-information extraction section an update-process-information storage section that stores, in association with a specific state in a business flow, update-process information representing a processing of updating the information stored in said address-information storage section;

an update-process-information extraction process that extracts, upon receiving event information including information representing said post-conversion-address information and a present state from said first user terminal, said update-process information from said update-process-information storage section based on the information representing said present state included in said received event information;

an address-information update process that updates the information stored in said address-information storage section based on said update-process information extracted by said update-process-information extraction section and said post-conversion-address information included in said received event information; an access acceptance/rejection judgment section that judges, based on the information stored in said real-address-information storage section, access acceptance or rejection with respect to said access request from said first user terminal to said second user terminal; and retrieval process that retrieves said real-address information of the second user based on the post-conversion-address information received from said service-providing server.

34. A non-transitory computer-readable medium embodying a reachability realization program that realizes reachability from a service-providing server held by a service-providing first user to a second user, said program causing a computer to execute:

a real-address-information receiving section that receives real-address information, which is capable of contacting there through to the second user, from a second terminal used by the second user;

a post-conversion-address-information generation section that generates post-conversion-address information, which the first user cannot specify and which corresponds to said real-address information received by said real-address-information receiving section;

an access-request transfer section that transfers to said second user terminal an access request to said first user terminal based on said real address information extracted by said real-address-information extraction section;

an address-information storage section that stores, in association with a specific state in a business flow, said post-conversion-address information generated by said post-conversion-address information in association with said real-address information of the second user;

a real-address-information extraction section that extracts, upon receiving an access request including said post-address information from a first user terminal used by the first user, said real-address information corresponding to said post-conversion-address information included in said received access request from said address-information storage section;

an access-request transfer section that transfers to said second user terminal said access request from said first user terminal based on said real-address information extracted by said real-address-information extraction section an update-process-information storage section that stores, in association with a specific state in a business flow, update-process information representing a processing of updating the information stored in said address-information storage section:

update-process-information extraction processing that extracts, upon receiving event information including information representing said post-conversion-address information and a present state from said first user terminal, update-process information from an update-process-information storage section that stores, in association with a specific state in a business flow, said update-process information representing processing of updating the information stored in said address-information storage section, based on information representing the present state included in said received event information;

address-information update processing that updates the information stored in said address-information storage section based on said update-process information extracted in said update-process-information extraction processing and said post-conversion-address information included in said received event information; and judgment processing that judges, based on the information stored in said real-address-information storage section, access acceptance or rejection with respect to said access request from said first user terminal to said second user terminal.

* * * * *